US011036506B1

(12) United States Patent
Redington et al.

(10) Patent No.: US 11,036,506 B1
(45) Date of Patent: Jun. 15, 2021

(54) MEMORY SYSTEMS AND METHODS FOR HANDLING VECTOR DATA

(71) Applicant: Motorola Solutions, Inc., Chicago, IL (US)

(72) Inventors: Jerry Redington, Amherst, NH (US); Johnny R. Ferreira, Sunrise, FL (US); Charles R. Ruelke, Coral Springs, FL (US)

(73) Assignee: Motorola Solutions, Inc., Chicago, IL (US)

( * ) Notice: Subject to any disclaimer, the term of this patent is extended or adjusted under 35 U.S.C. 154(b) by 0 days.

(21) Appl. No.: 16/710,862

(22) Filed: Dec. 11, 2019

(51) Int. Cl.
*G06F 9/30* (2018.01)

(52) U.S. Cl.
CPC ...... *G06F 9/30043* (2013.01); *G06F 9/30032* (2013.01); *G06F 9/30036* (2013.01)

(58) Field of Classification Search
None
See application file for complete search history.

(56) References Cited

U.S. PATENT DOCUMENTS

| | | | | |
|---|---|---|---|---|
| 6,061,779 | A * | 5/2000 | Garde | G06F 9/30043 712/204 |
| 6,978,359 | B2 * | 12/2005 | Miyamori | G06F 9/30032 712/204 |
| 7,219,212 | B1 | 5/2007 | Sanghavi et al. | |
| 7,376,812 | B1 * | 5/2008 | Sanghavi | G06F 9/30021 712/22 |
| 9,792,098 | B2 * | 10/2017 | Bertolli | G06F 8/54 |
| 10,372,451 | B2 * | 8/2019 | Kim | G06F 9/3816 |
| 10,579,514 | B2 * | 3/2020 | Bradbury | G06F 12/023 |
| 2007/0011441 | A1 * | 1/2007 | Eichenberger | G06F 9/3013 712/221 |
| 2007/0106883 | A1 * | 5/2007 | Choquette | G06F 9/3816 712/225 |

OTHER PUBLICATIONS

Tensilica Datasheet, ConnX Family of Radar, Lidar, and Communications DSPs by Cadence, at www.cadence.com, 3 pages, 2019.

* cited by examiner

*Primary Examiner* — Corey S Faherty
(74) *Attorney, Agent, or Firm* — Baker Botts L.L.P.

(57) ABSTRACT

Some example memory systems include a load and store unit (LSU) operable to load a memory reference. The LSU may include an alignment register, a current memory reference register, and a vector register. The memory system may include a memory coupled to the LSU. The memory may be operable to store a memory reference. The memory reference may be aligned or unaligned in the memory, and the LSU may be operable to efficiently load both unaligned and aligned memory references. Some example memory systems include a load and store unit (LSU) operable to store to the memory at a memory address. The LSU may be operable to efficiently store to both unaligned and aligned memory addresses. The LSU may perform loads and stores in forward and reverse stride.

24 Claims, 15 Drawing Sheets

MEMORY SYSTEMS AND METHODS FOR HANDLING VECTOR DATA

BACKGROUND OF THE INVENTION

A memory of a computational unit may have a set of memory lines. Each memory line may have a discrete set of unique addresses, with a first address, subsequent addresses, and a last address. The memory may store at each address a data element of n bits. When loading a memory reference of data elements from the memory, the memory reference target address to be loaded may be "unaligned" with respect to the memory line addressing. Such unaligned memory references create a need for a memory system that is operable to perform unaligned loads, whereby portions of a memory lines having less than the full memory line is loaded using a minimal number of clock cycles. Similarly, when storing user content, it may be desirable to store the user content such that it is unaligned with respect to the memory lines.

Unaligned memory references are useful because the processor can return the appropriate content to an application, such that the application is abstracted from the hardware layer of the processor. But unaligned memory references may reduce efficiency. Efficiency may be reduced through a variety of mechanisms, including, by performing a double-load of contiguous aligned references that contain the targeted unaligned reference data elements. That is, some memory systems load a first memory line and a second memory line to accomplish a single load of an unaligned line. Efficiency may also be degraded when a processor performs operations using lines of set line lengths, as the processor may need to perform lane extraction to pull the data elements stored in the first memory line, followed by a pull of data elements stored in the second memory line, and combine those data elements such that the line is usable as an operand. Such lane extraction requires additional processing by the computational unit. Additionally, the ability to load and store in both forward stride and reverse stride add complexity that reduces efficiency.

SUMMARY

Disclosed herein are memory systems providing efficient loading and storing capabilities. The loading and storing capabilities allow for loading aligned and unaligned memory references and storing user content at aligned or unaligned memory addresses. The memory systems have increased efficiency, providing effective solutions for both reverse stride and forward stride loads and stores.

In some example embodiments, a memory system includes a load and store unit (LSU) operable to load a memory reference. The LSU may include an alignment register, a current memory reference register, and a vector register. The memory system may include a memory coupled to the LSU. The memory may be operable to store a memory reference. The memory reference may include a first memory line and a second memory line.

The LSU may be operable to load at least a portion of the first memory line into the alignment register, thereby forming an alignment register content to form a priming load. The LSU may be operable to load at least the portion of the second memory line into the current memory reference register, thereby forming a current memory reference register content.

The memory reference may be aligned or unaligned in the memory, and the LSU may be operable to efficiently load both unaligned and aligned memory references. When the memory reference is aligned in the memory, the LSU may be operable to load the alignment register content into the vector register to perform an aligned production read. When the memory reference is unaligned in the memory, the LSU may be operable to conjoin a portion of the alignment register content and a portion of the current memory reference register content into the vector register to perform an unaligned production read. To prepare for loading of subsequent memory lines or portions of memory lines, the LSU may be operable to then copy the current memory reference register to the alignment register.

In some example embodiments, the LSU may have load and store symmetry. Load and store symmetry allows the memory system to operate more efficiently by reducing complexity. The LSU may be operable to store at a memory address, in part by being operable to perform the following actions. The LSU may be operable to store a first user content into the current memory reference register. Depending on whether the memory address is aligned or unaligned, the LSU may perform different actions. When the memory address is aligned, the LSU may be operable to store during an aligned first store, the first user content into the vector register. When the memory address is unaligned, the LSU may be operable to update the alignment register from the current memory reference register. The LSU may be operable to update the current memory reference register with a second user content. The LSU may be operable to conjoin a portion of the memory reference register with a portion of the alignment register into the vector register during an unaligned store.

It may be desirable to load the entire memory reference. In some embodiments, LSU is further operable to iteratively repeat loads after the priming load until the entire memory reference is loaded.

When loading, it may be desirable to zero unwanted elements derived from the memory to increase the efficiency of loading the desired elements. In some embodiments, the LSU may include an address clamp coupled to the current memory reference register and the alignment register. The address clamp may be operable to zero at least a portion of the memory reference. The portion of the memory reference may be beyond an address range such that the address clamp is operable to generate at least the portion of the first memory line and at least the portion of the second memory line. The address range may be selected based at least on a stride operand.

In some embodiments, the LSU may be operable to generate a plurality of subset vectors. The plurality of subset vectors may facilitate more efficient loading by automatically presenting multiple options derived from any of the plurality of subset vectors. In some embodiments, the LSU generates the plurality of subset vectors from the current memory reference register and the alignment register. The plurality of subset vectors may include a first subset vector and a second subset vector, the second subset vector shifted based at least on a stride operand. The stride operand may allow for loading and storing in reverse and forward stride.

The stride operand may allow the LSU to generate the appropriate subset vectors based on whether the LSU is loading in forward stride or reverse stride. Depending on the stride, certain portions of the alignment register and the current register need be derived.

For example, in some embodiments, the LSU may be operable to generate the plurality of subset vectors such that, when the stride operand indicates reverse stride, the second subset vector is right shifted from the first subset vector. The LSU may be operable to generate the plurality of subset vectors such that a least significant data element portion of the second subset vector is derived in order from the most significant data element portion of the current memory reference register. The LSU may be operable to generate the plurality of subset vectors such that a most significant data element portion of the second subset vector is derived in order from a least significant data element portion of the alignment register. The second subset vector may be right shifted by a number of right shift data elements. The number of right shift data elements may be equal to a number of data elements of the most significant data element portion of the current memory reference register.

For further example, in some embodiments, the LSU may be operable to generate the plurality of subset vectors such that, when the stride operand indicates forward stride, the second subset vector is left shifted from the first subset vector. The LSU may be operable to generate the plurality of subset vectors such that a most significant data element portion of the second subset vector is derived in order from a least significant data element portion of the current memory reference register. The LSU may be operable to generate the plurality of subset vectors such that a least significant data element portion of the second subset vector is derived in order from a most significant data element portion of the alignment register. The second subset vector may be left shifted by a number of left shift data elements. The number of left shift data elements may be equal to a number of data elements of the least significant data element portion of the current memory reference register.

So that the LSU may select which of the plurality of subset vectors are to be used, in some embodiments, the LSU includes an alignment multiplexor and the LSU is operable to input the plurality of subset vectors into the alignment multiplexor.

Upon loading from memory, it may be desirable to rearrange elements of a loaded vector. In some embodiments, the LSU may include a vector lane replicator. The vector lane replicator may be operable to receive a subset vector of the plurality of subset vectors, the subset vector including a plurality of data elements. The vector lane replicator may be operable to rearrange at least a portion of the plurality of data elements. To reduce complexity of load and store operations, the vector lane replicator may be operable to zero at least a portion of the plurality of data elements.

So that a user or system can command the LSU to perform certain load or store operations, the LSU may be operable to receive an instruction word. The instruction word may include a memory address corresponding to a location in memory and a memory line length content, corresponding to a number of data elements to be loaded from memory. The memory address may be located in an unaligned or aligned position. If the memory address is aligned and evenly divisible by the line length of the memory, then it may be desirable to perform an aligned read. The LSU may be operable to, in response to the memory address, determine whether to perform at least one of the group selected from the aligned production read and the unaligned production read.

In some example embodiments, a memory system includes a load and store unit (LSU) operable to store to the memory at a memory address. The memory system may include a memory. The LSU may include an alignment register, a vector register; and a user current content register. The LSU may be operable to store a first user content into the user current content register.

The LSU may behave differently based on whether the memory address is aligned so that the memory system can efficiently store content at an aligned destination or an unaligned destination. The LSU may be operable to, when the memory address is aligned, store during an aligned first store, the first user content into the vector register. The LSU may be operable to, when the memory address is unaligned, update the alignment register from the user current content register, update the user current content register with a second user content, and conjoin a portion of the user current content register with a portion of the alignment register into the vector register.

So that all desired content is stored to the memory, the LSU may be operable to iteratively repeat storing after the first user content is stored into the user current content register, until the LSU stores to all of the memory reference.

When storing, it may be desirable to zero unwanted elements derived from a user content to be stored to increase the efficiency of loading the desired elements. In some embodiments, the LSU may include an address clamp coupled to the vector register. The address clamp may be operable to zero at least a portion of the user content, thereby generating a masked user content, that inhibits storing data elements for at least the portion of the user content beyond an address range. The address range may be selected based at least on a stride operand.

In some embodiments, the LSU may be operable to generate a plurality of subset vectors. The plurality of subset vectors may facilitate more efficient storing by automatically presenting multiple options derived from any of the plurality of subset vectors. In some embodiments, the LSU generates the plurality of subset vectors from the user current content register and the alignment register. The plurality of subset vectors may include a first subset vector and a second subset vector, the second subset vector shifted based at least on a stride operand. The stride operand may allow for loading and storing in reverse and forward stride.

Before storing to memory, it may be desirable to rearrange elements of user content. In some embodiments, the LSU may include a vector lane replicator. The vector lane replicator may be operable to receive a subset vector of the plurality of subset vectors. The subset vector may include a plurality of data elements. The vector lane replicator may be operable to rearrange at least a portion of the plurality of data elements. To reduce complexity of load and store operations, the vector lane replicator may be operable to zero at least a portion of the plurality of data elements.

The stride operand may allow the LSU to generate the appropriate subset vectors based on whether the LSU is storing in forward stride or reverse stride. Depending on the stride, certain portions of the alignment register and the user current content register need be derived.

For example, in some embodiments, the LSU may be operable to generate the plurality of subset vectors such that, when the stride operand indicates reverse stride, the second subset vector is left shifted from the first subset vector. The LSU may be operable to generate the plurality of subset vectors such that a least significant data element portion of the second subset vector is derived in order from the most significant data element portion of the user current content register. The LSU may be operable to generate the plurality of subset vectors such that a most significant data element portion of the second subset vector is derived in order from a least significant data element portion of the alignment register. The second subset vector may be left shifted by a number of left shift data elements. The number of left shift data elements may be equal to a number of data elements of the least significant data element portion of the alignment register.

For further example, in some embodiments, the LSU may be operable to generate the plurality of subset vectors such that, when the stride operand indicates forward stride, the second subset vector is right shifted from the first subset vector. The LSU may be operable to generate the plurality of subset vectors such that a most significant data element portion of the second subset vector is derived in order from a least significant data element portion of the user current content register. The LSU may be operable to generate the plurality of subset vectors such that a least significant data element portion of the second subset vector is derived in order from a most significant data element portion of the alignment register. The second subset vector may be right shifted by a number of right shift data elements, the number of right shift data elements equal to a number of data elements of the most significant data element portion of the alignment register.

So that the LSU may select which of the plurality of subset vectors are to be stored, in some embodiments, the LSU includes an alignment multiplexor and the LSU is operable to input the plurality of subset vectors into the alignment multiplexor.

So that a user or system can command the LSU to perform certain load or store operations, the LSU may be operable to receive an instruction word. The instruction word may include a memory address corresponding to a location in memory and a memory line length content, corresponding to a number of data elements to be stored to memory. The memory address may be located in an unaligned or aligned position. If the memory address is aligned and evenly divisible by the line length of the memory, then it may be desirable to perform an aligned store. The LSU may be operable to, in response to the memory address, determine whether to perform at least one of the group selected from the aligned production read and the unaligned production read. In some embodiments, the LSU performs at least one of the group selected from the aligned store and the unaligned store based on the value of a valid bit (V bit).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
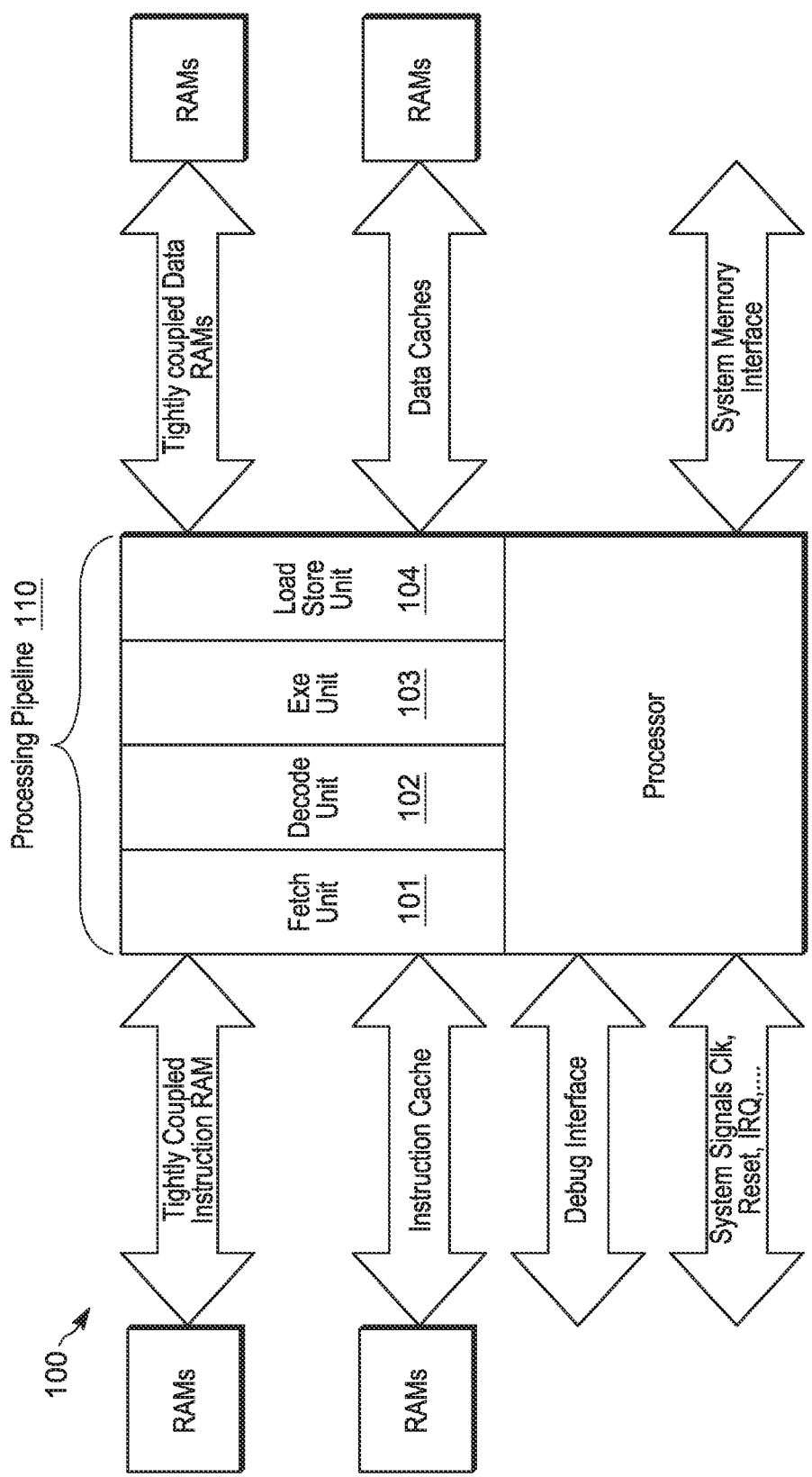
FIG. 1 is a block diagram of an example processor complex in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

There is a need for a memory system that is operable to perform unaligned loads and stores, while electively sorting portions of a memory line to different portions of a memory line when less than the full line is needed to be loaded or stored. The systems disclosed herein perform efficient loading and storing of aligned and unaligned references in both forward stride and reverse stride memory accesses.

Some signal processing applications requiring access to multi-element data vectors can be encumbered with formatting the order of a multi-element data vectors prior to applying it to an execution unit as an operand. Reformatting a multi-element data vector may require reordering the data elements within the vector (consider matrix multiplication), or reading a smaller vector and expanding it to a larger vector (consider multiplying a common scalar to a complex number), or reading a wide data vector and down selecting data elements to form a narrow data vector (extracting real numbers from a complex number) or finally reading a data vector of any size (i.e. equal in width, larger or smaller than the target operand width) and zeroing individual data elements. All of the aforementioned data manipulations may require many additional operations to shuffle, expand, contract or zero data elements prior to presenting a data vector as an operand to an execution unit. Some memory systems disclosed herein incorporate this functionality as vector lane replication, including, for example, data element shuffling, expansion, extraction, zeroing, other functionality, or a combination thereof.

FIG. 1 illustrates a memory system 100 in accordance with some example embodiments. The memory system 100 includes a processing pipeline 110. A memory system 100 may interface to a plurality of memory elements, both external memory and internal memory units, where both data and instruction sequences may be stored. The processing pipeline 110 functions to decode a specified instruction, retrieve the targeted data, and manipulate the subsequent data processing in an efficient manner. Accordingly, processing pipeline 110 may include a number of sub-units including, but not limited to, a fetch unit 101, a decode unit 102, an execution/address generation unit 103, a load/store unit 104, and other units not described in this drawing. Element 100 embodies the processor unit with attached RAMs, ROMs, system memory and other processor related interfaces. Memory systems disclosed herein may reside partially or fully in the processing pipeline 110.

Figure 2:
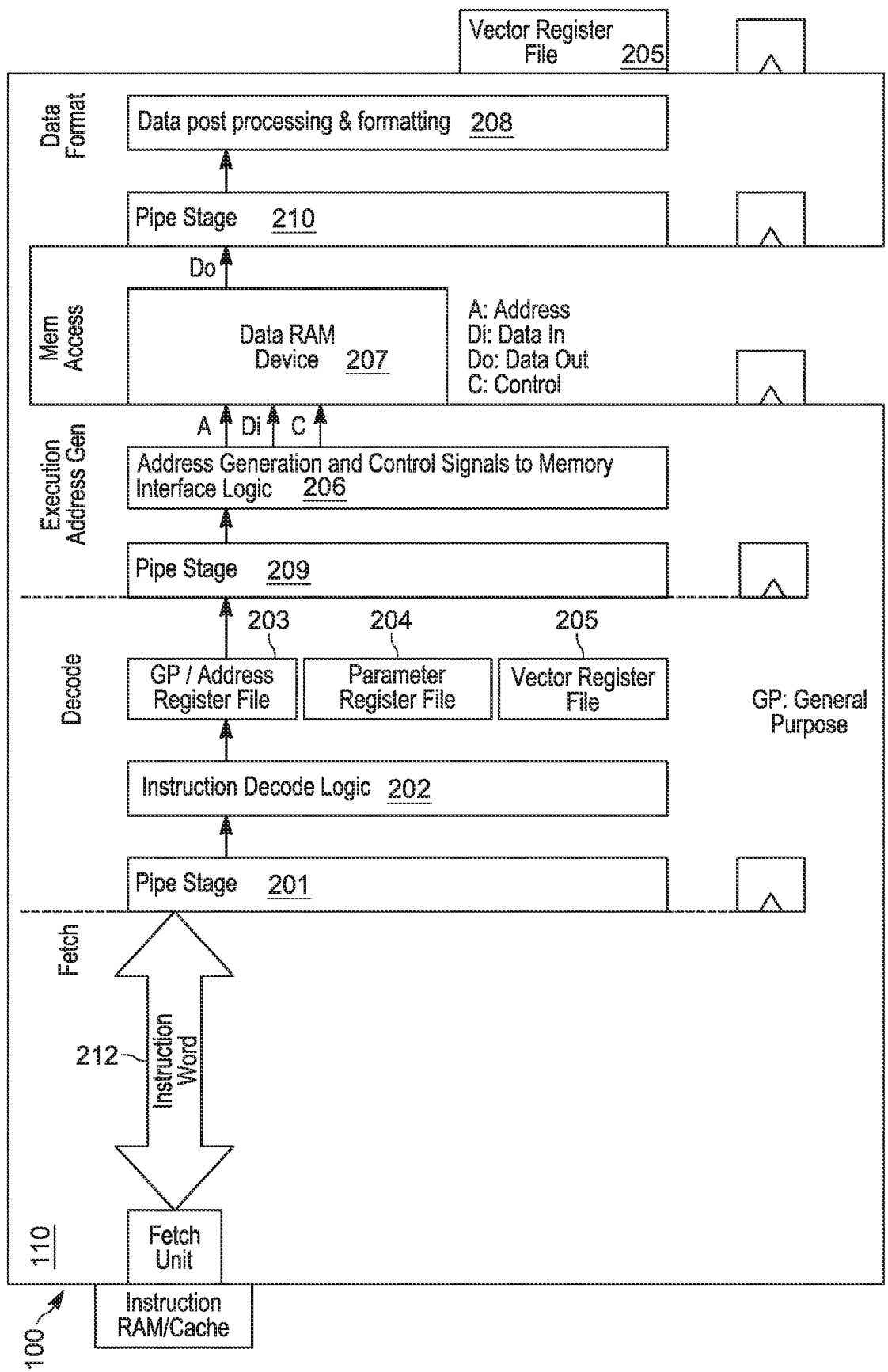
FIG. 2 is a block diagram of an example processor complex in accordance with some embodiments.

FIG. 2 depicts a processing pipeline 110 of a memory system 100 in accordance with some example embodiments. The memory system 100 includes a fetch unit 101 that "fetches" an instruction word 212 from an instruction storage element such as a cache or RAM memory component. Once the fetch unit 101 receives instruction word 212 from the instruction storage element, the memory system 100 (which includes the processing pipeline 110) can use the instruction word 212 to perform an operation. The decode unit 102 receives the instruction word to generate an extracted instruction as generated by instruction Decode Logic 202. Once the instruction word is received by Fetch Unit 101, and decoded by Decode unit 102, the instruction word OpCode is executed by Execution Unit 103 to provide the targeted data to the Load/Store Unit 104 that includes processing by Data Processing and Formatting Logic 208.

An Instruction word is a concatenation of multiple bit fields of various lengths; each bit field serving either to identify an operation, a variable, or both. Generally speaking, operand fields may be considered as "variables," and the opcode field identifies the function to be used when operating on the operand variables. Accordingly, an instruction word must include at least one opcode, and at least one operand. An instruction word is typically a predefined length of bits (i.e., 24 bit, 32 bits, 64 bits, etc.) and may contain various combinations of opcodes and operand fields. The extracted instruction word is parsed for an encoding format, where the encoding format identifies the bit ranges within the instruction word that corresponds to the opcode and the various operand fields. For example, the encoding format may identify single or multiple operations as may be encoded into the instruction word along with the extraction of operand fields in support of their respective operations.

In accordance with some embodiments, an opcode of an operation extracted from the instruction word by the Instruction Decode Logic 202 is compared to an unaligned memory access opcode. If an opcode match exists, operands are extracted from the opcode instruction word in support of the opcode. Operands fall into two broad categories in relation to the instruction word-that is operands fields used in indirect access to a register file or other addressable memory structures, or operand fields used directly from the instruction word. Operands used directly from the instruction word may be referred to as "immediate operands." When an operand is used to access a register file or register(s), the operand bits form an address (an indirect access to a memory element to produce the final operand) that is used to reference a memory structure. In accordance with some example embodiments, operand bits may be used to access the General Purpose (GP) register 203, parameter registers 204, and or vector register file 205, to produce the final operand for an execution unit to subsequently accomplish the desired work as constrained by the specified rule of the operation.

Within the Execution and Address Control Logic 206, contained within the Execution-Address Generation unit 103, the specified rule of the operation is accomplished to form a memory reference address of a data item or data vector in memory, as well as to support subsequent post memory access processing. A memory reference may include targeted data elements that are the object of the load-store operation. A memory reference may also include other information, such as an address corresponding to the location of the targeted data elements. Data RAM 207 maybe an external or internal memory component, which is then accessed in either a read or write mode so as to fetch or deposit data respectively, into the targeted memory location (i.e., address). At the conclusion of the read memory access, data exiting the data ram 207 is fed to a data post processing logic block 208, contained within the Data Formatting sub-system of block 104, which formats the output data in accordance to the specified rules of the operation. After proper formatting is completed, the data may then be written back into the same vector register file 205 that was previously accessed as part of the instruction word Decode processing in sub-system 102. According to some embodiments, pipeline stages 201, 209, and 210, for example, can be inserted into the processing pipeline 110 of FIG. 2 achieve design operating objectives.

Figure 3:
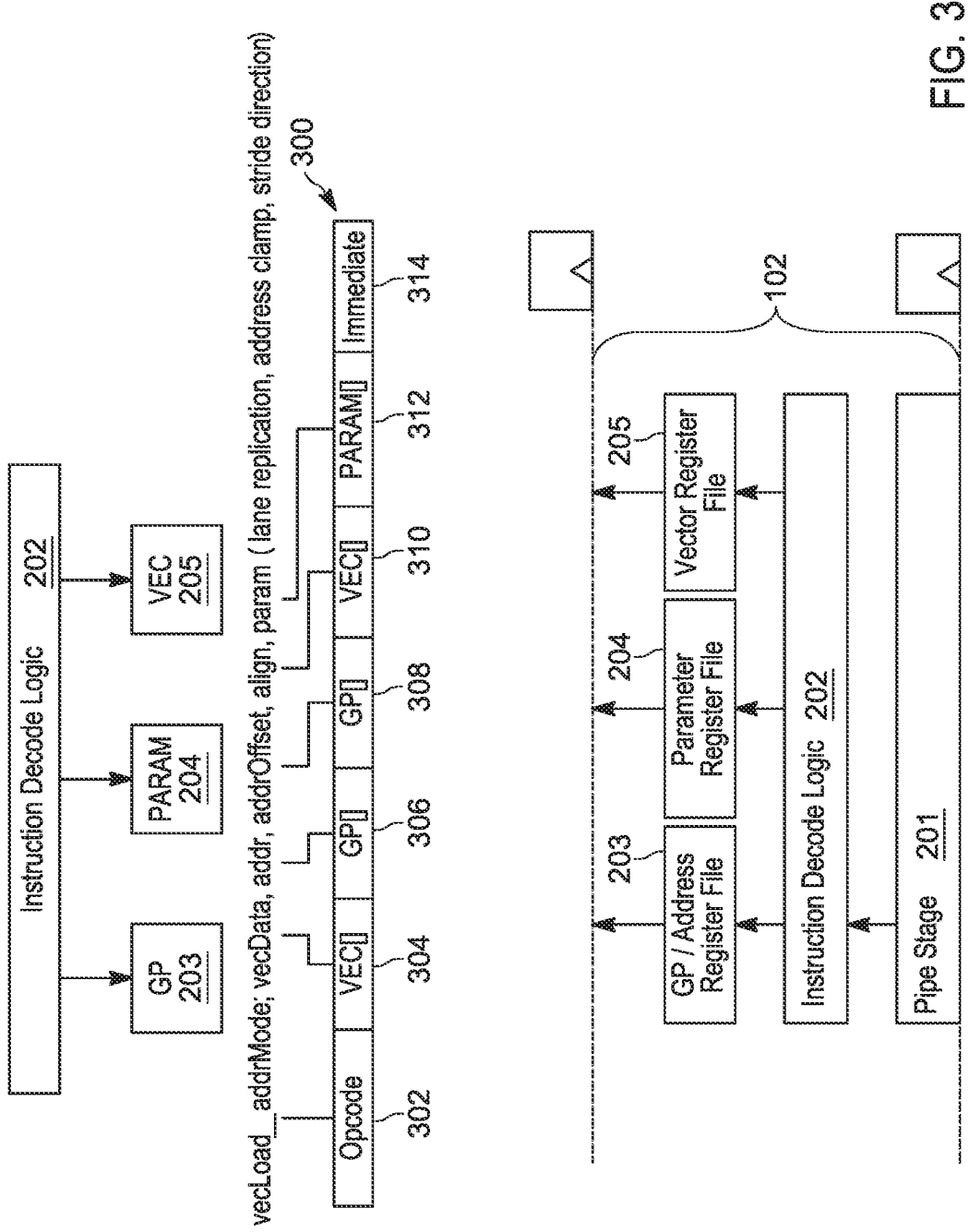
FIG. 3 is a block diagram of an example decode unit within a processing pipeline in accordance with some embodiments.

FIG. 3 illustrates an example instruction word 300 incorporating an associated encoding format in accordance with some embodiments. The opcode and operand bit fields in instruction word 300 are extracted from the instruction word based on an encoding format in accordance to the rules of a corresponding opcode. A plurality of register files 203, 204, and 205 are accessed to produce operands for processing by the subsequent execution/address generation unit 103 (not shown) that follows the decode unit 102. The output product of the decode unit 102 is to provide input operands for an execution unit to accomplish the specified rules of the operation targeted by the opcode. The operand fields processed by decode unit 102 are identified by the instruction word encoding format, and function to index specific bit regions in a targeted register file so as to return a range of bit values from the register file being accessed. The targeted register file may be a General Purpose (GP)/Address Register file 203, Parameter Register file 204 and/or the Vector register file 205. These register files 203, 204 and 205 may have varying bit lengths of N bits, M bits, and P bits respectively, where each register files contains information relevant to the operation being processed.

In some example embodiments, a 32-bit instruction word 300 may encode a base opcode 302, a data operand 304, an address operand 306, an address offset 308, an alignment operand 310, a parameter operand 312, and an immediate operand 314. Each of these pieces of the instruction word 300 may be represented by a subset of the 32 bits of the instruction word 300.

The data operand 304 accesses the Vector Register file 205 so as to acquire (i.e., read or write access) the vector data from memory that is to be operated on in Execution Block 103. In addition, the same Vector Register file 205 may contain the alignment data that is indexed (i.e. accessed) by the instruction word 300 by alignment operand 310. Root addressing information may be stored in the GP/Address Register file 203 and may be accessed by the instruction word 300 by an operand 306, while an address offset 308 may be indexed from the same GP/address register file 203. Finally, Parameter register 204 may be indexed using a parameter operand 312, where the parameter operand 312 sets the rules for formatting and processing the relevant data. The parameter operand 312 may contain one or more parameters including, lane replication, address clamp, stride direction and enables for the particular options within the parameter operand itself. The parameter information that dictates the lane replication sets which bits in a memory read/write operation (i.e., load/store data transport in relation to the processor) that may be remapped to different bit locations. The parameter operand 312 may define the address clamp value sets the maximum address threshold whereby read/write data located in address locations exceeding the threshold are "clamped" to zero and corresponding byte enables are inactive. The parameter operand 312 may be a stride operand. The stride operand may define the stride direction by which the data is accessed in a memory device load/store operation, namely, if the data is accessed using increasing address locations, or decreasing addressing locations, relative to an initial starting address.

As shown, the addressing, parameter and vector information is located in a differentiated register files 203, 204 and 205, respectively, the information being indexed may be combined into one register file entry or split between multiple register files or included as an immediate operand in the instruction word. The base opcode 302 may encode parameter option enables for each option as another means of specification. Specifying operation parameters in the opcode can improve efficiency in accessing and manipulating data by performing multiple tasks in tandem. This means that operand bits used to access register files can be either implied via the opcode 302 or explicitly represented by a subset of bits in the instruction word 300 either organized adjacent from one another or distributed without adjacency or a combination of the two. The operand bits used to access a register file may be referred to as indirect operands in that the final operand output is the value resident in the register file or register access, not the value of the operand bits themselves.

Figure 4:
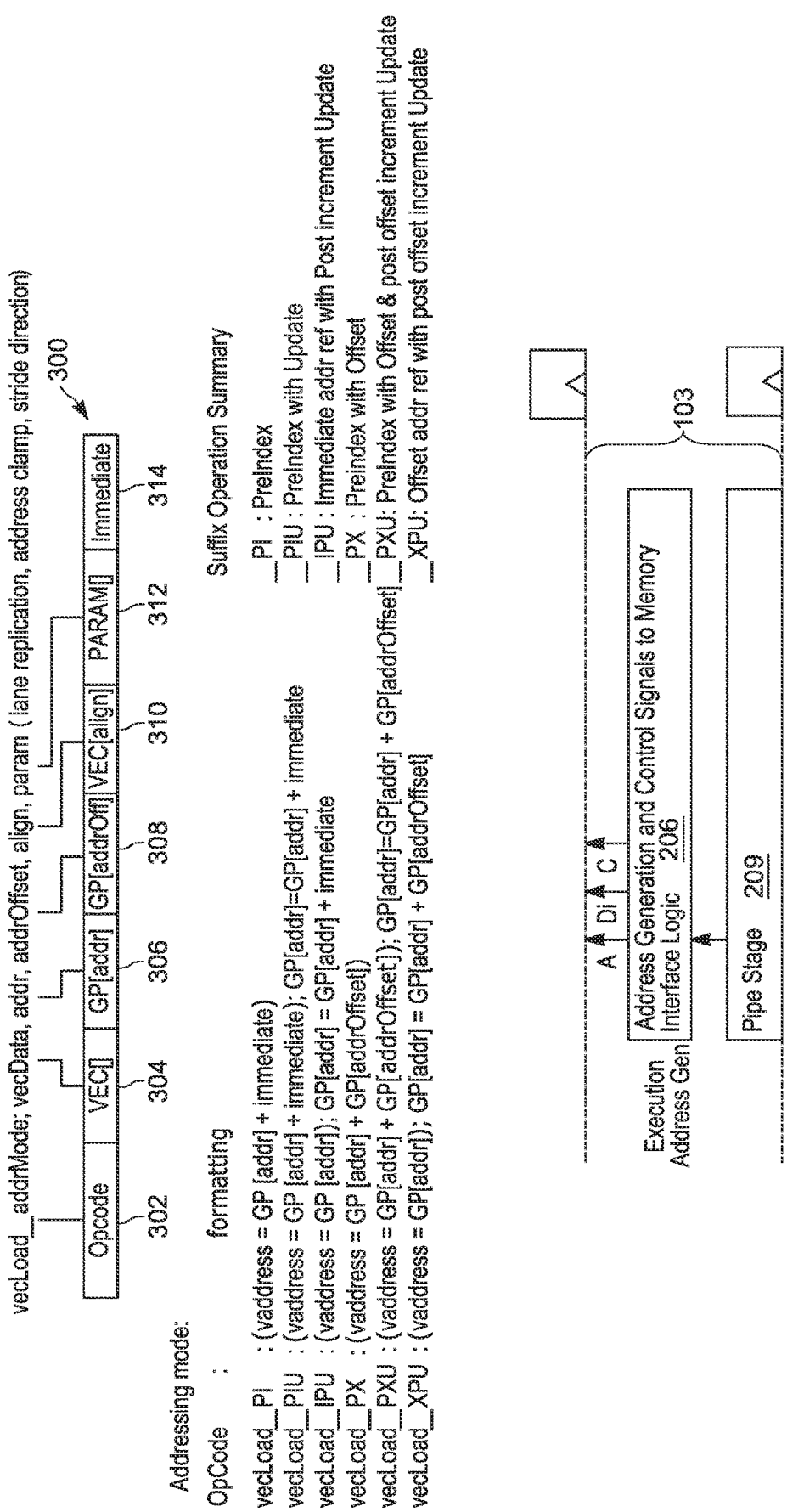
FIG. 4 is a block diagram of an execution/address generation unit within a processing pipeline in accordance with some embodiments.

FIG. 4 depicts an example of generating an address value for a memory access operation in accordance with some example embodiments. Single or multiple addressing modes maybe employed to target a memory element at a specific memory location. There are many addressing modes that may be used to generate a particular address value as illustrated in FIG. 4. The addressing modes, and their associated formatting, may include address pre-indexing, address pre-index with update, addressing immediate reference with post-increment update, address pre-indexing with address offset, address pre-indexing of address offset with post offset increment update, and offset addressing reference with post offset increment update. Other addressing modes not delineated in FIG. 4 may also be used. In general, when processing an unaligned memory operation, the unaligned memory references using the above addressing modes construct the base memory reference address. This memory reference address is further processed to form an aligned memory address. In accordance with some example embodiments, an aligned memory reference (i.e., address) is a memory address that may be formed, for example, if the memory line length is 16 bytes, and the lower log 2(16) bits (i.e. lower 4-bits) of the address are set to a logic state of zero. Alternatively, the line length and vectors disclosed herein can be other lengths. The unmodified lower n-bits of the base address are used in a downstream function to extract data-elements referenced by the memory access. For reverse stride memory references there is an additional special case address manipulation to form the final memory reference, as discussed later.

Each addressing mode is identified using unique labeling format to differentiate the various addressing operations; a unique suffix is appended to a vector address instruction label to represent the addressing mode opcode 302 of instruction word 300 as processed by the Execution and Address Control Logic 206 in the Execution Address Generator 103 (depicted in earlier figures). The associated suffixes for the opcodes that trigger various address vector/memory access (vecLoad) are delineated in 401 of FIG. 4. Specifically, suffix PI identifies a pre-index memory addressing operation where the value taken from a GP/Address register file using Instruction word 300 address operand 306 is summed with the embedded immediate operand value 314 to form a target address for the memory device. Suffix PIU identifies a pre-index with update addressing dual operation where the PI pre-index sequence is processed in concert with updating the address value in GP/address register file 203 by summing the original address vector value as indexed from operand bits 306 of instruction word 300, with the embedded immediate operand value from bits 314, and pushing (i.e., update) the summed value back into the same address vector location in a GP/Address register file. Suffix IPU identifies an immediate address reference with post increment update dual operation where the reference address value is loaded as the immediate value in a GP/Address register file as indexed by instruction word 300 operand from bits 306, in concert with updating the pointing vector in the GP/address register file by summing the original address vector value indexed from operand bits 306 of instruction word 300, with the embedded immediate operand value from bits 314, and pushing the summed value back into the same address vector location in GP/Address register file 203. Suffix_PX identifies a pre-index with offset memory addressing operation where the value taken from the GP/Address register file 203 using Instruction word 300 operand from bits 306 is summed with the address offset value as indexed by operand from address offset operand 308. Suffix_PXU identifies a pre-index with offset and post offset update addressing dual operation where the PX pre-index with offset sequence is processed in concert with updating the address value in GP/address register file 203 by summing the original address vector value as indexed by operand bits 306 of instruction word 300, with the address offset value indexed from register file 203 by operand value from bits 308, and pushing the summed value back into the same address vector location in the GP/Address register file. Suffix XPU identifies an offset address reference with post offset update dual operation where the reference address value is loaded directly from the GP/Address register file as indexed by instruction word 300 operand from bits 306, in concert with updating the address value in GP/address register file 203 by summing the original address vector value as indexed by address operand 306 of instruction word 300, with the address offset as indexed by address offset operand 308, and pushing the summed value back into the same address vector location in GP/Address register file 203. The preceding instruction rules can be processed using either forward stride or reverse stride memory access during load/store operations, wherein the appropriate register files indigenous to a Load/store unit (LSU) are appropriately indexed and their associated contents are re-aligned to produce the necessary data vectors for subsequent processing.

Figure 5:
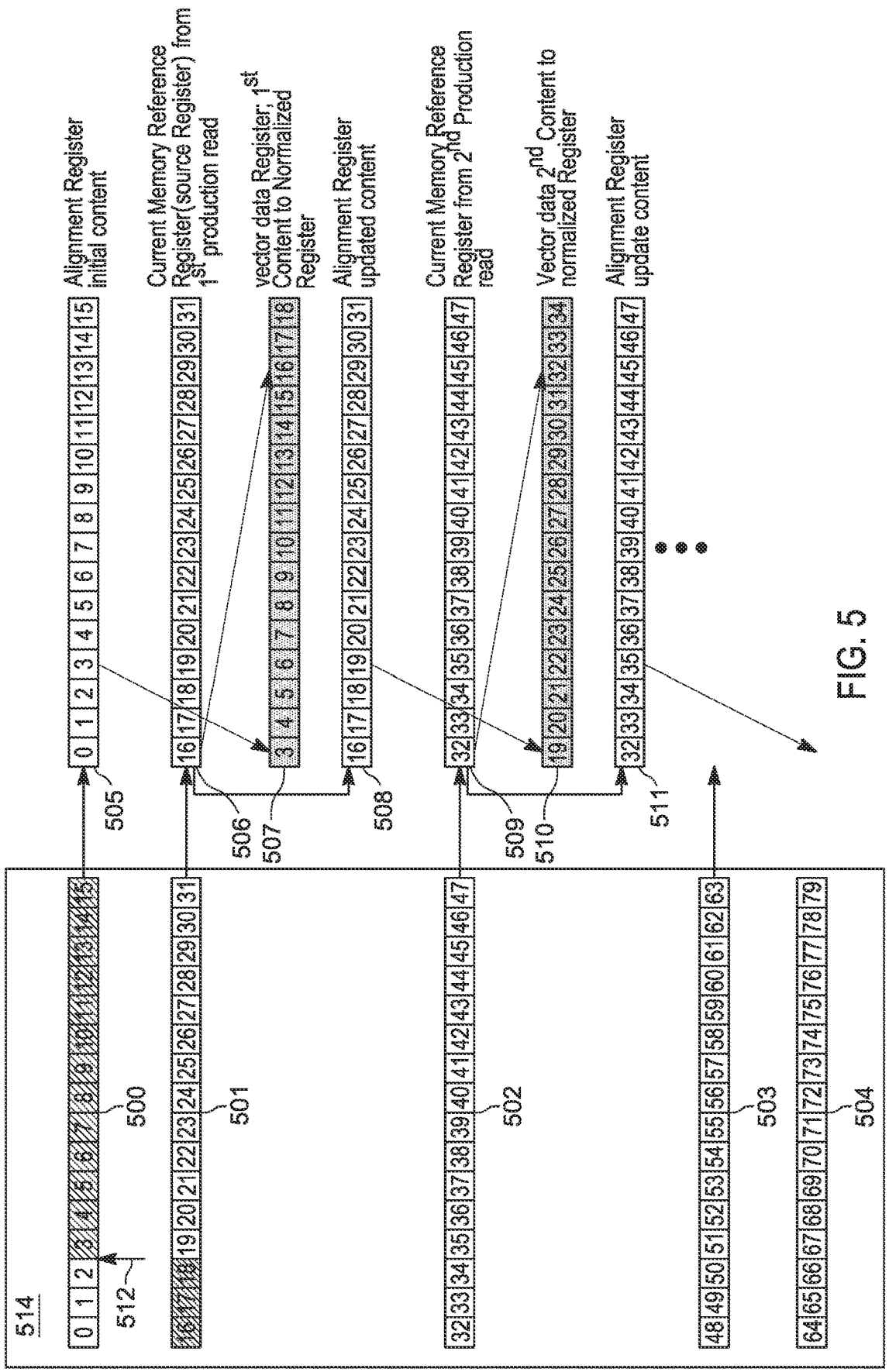
FIG. 5 is a block diagram depicting register content formed from a forward stride unaligned load from memory in accordance with some embodiments.
Figure 6:
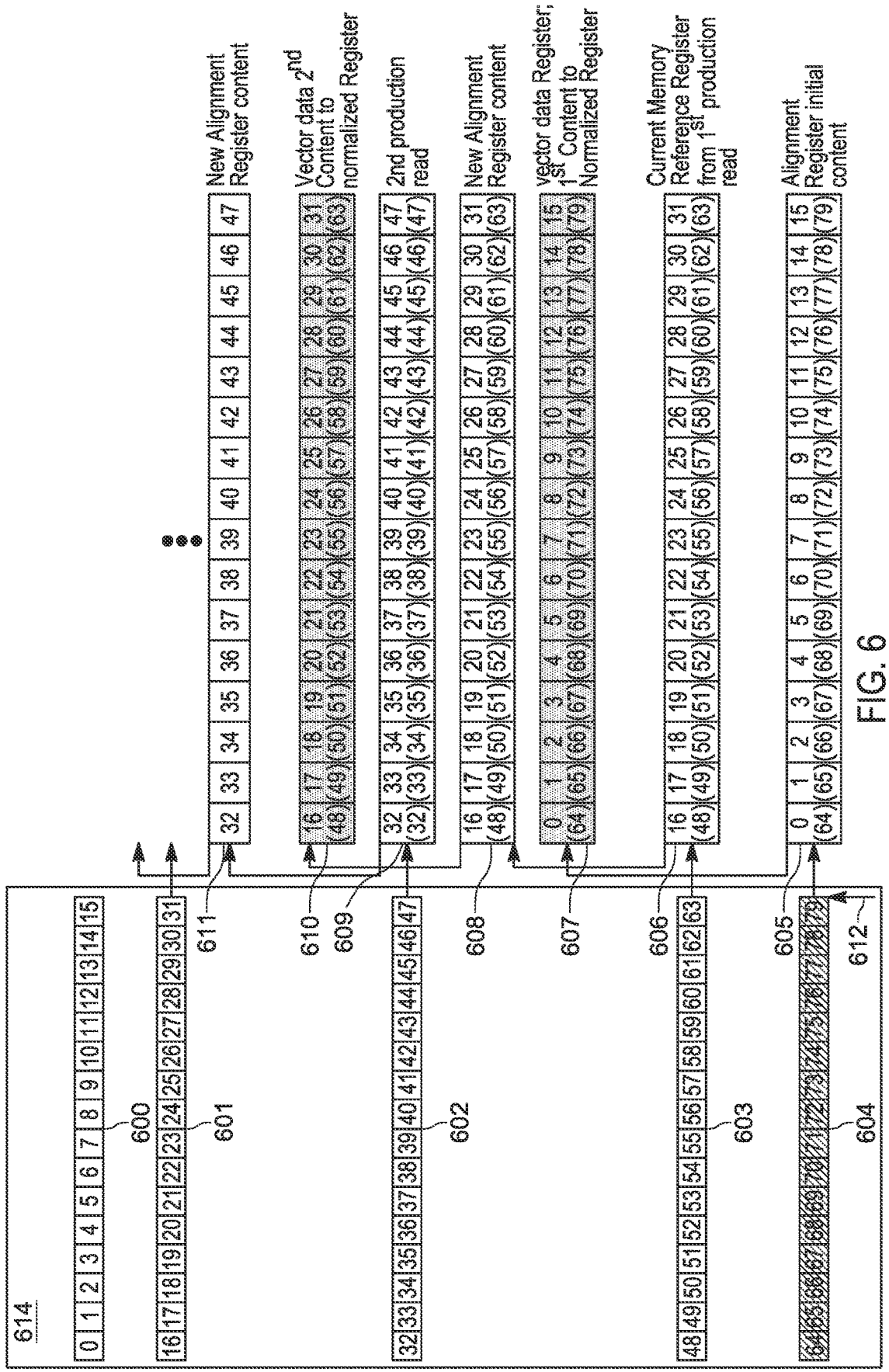
FIG. 6 is a block diagram depicting register content formed from a reverse stride aligned load from a memory.
Figure 7:
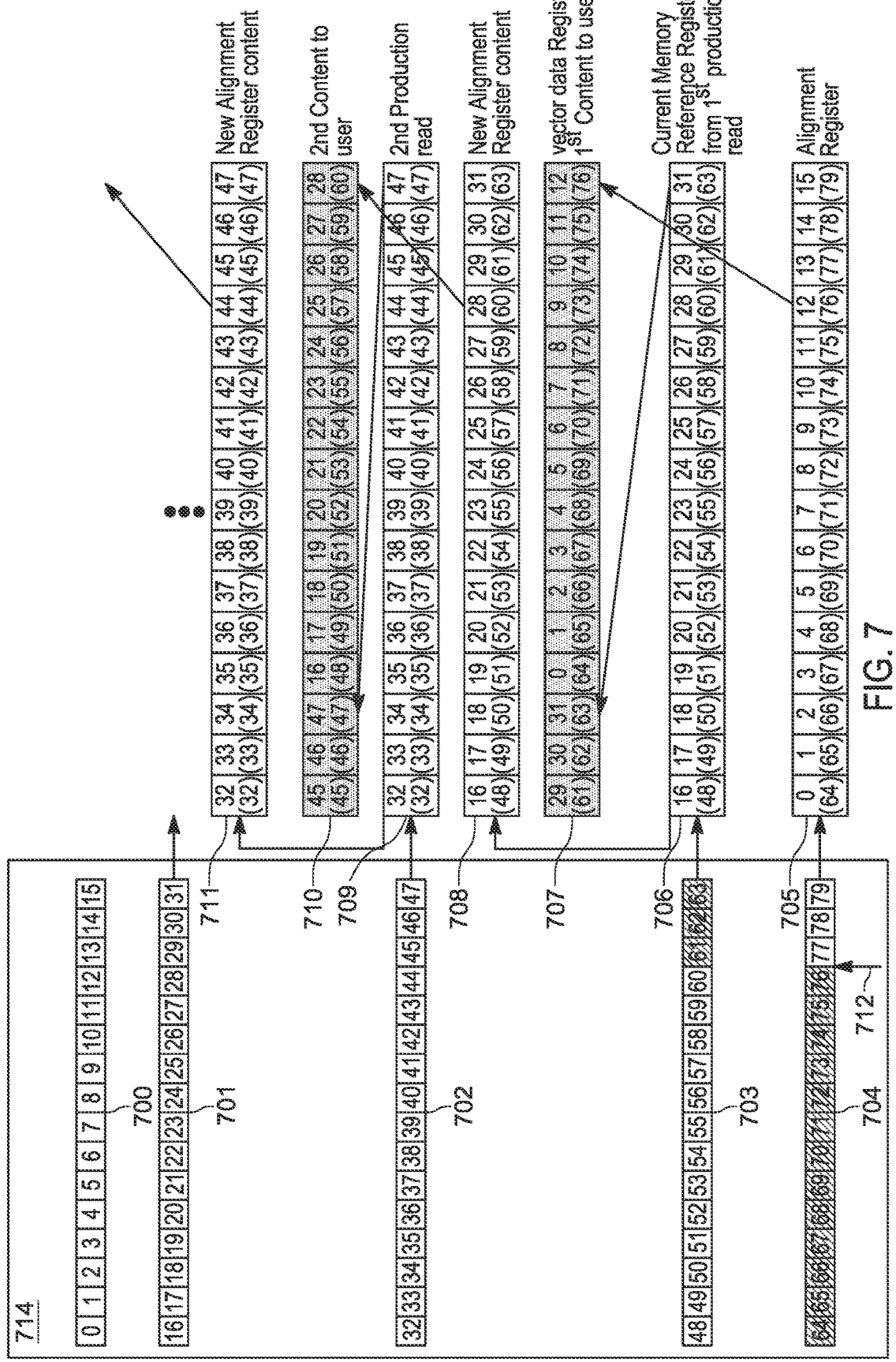
FIG. 7 is a block diagram depicting register content formed from a reverse stride unaligned load from a memory.

To better illustrate how some memory systems described herein perform loads, FIGS. 5-7 are included to depict the content that the memory systems read from a memory, and writes to the alignment register, current memory reference register, and vector register over time. The registers depicted in FIGS. 5-7 may depict content of a register at one time and then content of the same register at another time. Therefore, while two or more registers are shown, the figures may depict, for example, content in a vector register at one time and content in the same vector register at another time.

FIG. 5 illustrates an example, in accordance with some embodiments, of content written over time to an alignment register, a current memory reference register, and a vector register, when an example memory system performs a forward stride load. FIG. 5 depicts the case of unaligned memory access. For a forward stride memory operation, the memory references are issued in ascending order and the address used in the memory reference can either be aligned to a memory line length (aligned memory access) or not (unaligned memory access). Accordingly, for a forward stride memory reference, each subsequent memory reference address after the initial priming load into the alignment register is in ascending order.

FIG. 5 depicts an example of a forward stride unaligned load in accordance with some embodiments. Reference 500 represents a first memory line located within a memory component 514 (internal or external to a processor) wherein a memory line 500 includes 16 bytes of data. Each byte in memory line 500 is byte addressable given each byte is assigned a unique address (i.e., 0 through 15) in each box of memory line 500. In addition, 501 represents a second memory line following the first memory line 500, wherein memory line 501 includes 16 bytes of data, each byte being addressable using the unique number assigned to each box (i.e., 16 through 31) within both the memory line 501 and the memory component generally. In a similar manner, 502, 503 and 504 represent memory lines, each memory line including 16 contiguous bytes of data, each byte being addressable in ascending order using the unique number assigned to each box within a both a given memory line and the memory component. Additional memory lines (not shown) may be present in a memory component. It is apparent to those skilled in the art that a memory line length may be of any length (i.e., 8, 16, 24, 32, etc.). Given that a memory line length may vary based on the memory component, the meaning of an aligned or unaligned load/store operation must be specific to the memory being targeted. In other words, a memory access at byte address "8" would be an aligned load/store for a line length of 8 bytes, but would be an unaligned load/store for a memory reference having non-eight-byte (i.e., 16) byte line length.

The memory component in FIG. 5 is accessed by a Load/store unit (not shown) using a 16-byte (i.e., equal to a memory line length) load operation. The desired data being targeted by the processor begins at byte "3" (i.e., where a pointer 512 in memory line 500 is located) and extends for 16 bytes for through memory line 501 (i.e., diagonal line highlights). The desired data may be referred to as a memory reference. Accordingly, FIG. 5 illustrates a Forward Stride read of 16 bytes of data beginning at third byte. Because the third byte address (3') is not evenly divisible by 16 an unaligned memory access technique must be employed to return the desired value from memory. The Load/store unit (LSU) may perform a first load, or a "priming load", by loading the entire first memory line 500 into the LSU alignment register 505. The LSU may then perform a second load, or a first "production read", where the LSU loads memory line 501 into the current memory reference register 506 while conjoining the appropriate contents of the alignment register 505 with the memory reference register 506 to produce the desired contents for the user in the vector register 507, where the data in Least Significant Byte (LSB) position of vector register 507 contains the first desired byte value of the targeted data. Specifically for this example, during a production read the LSU extracts the contents of the alignment register into the user content vector register such that the first byte in the vector register correlates to the first byte of the targeted data (i.e., byte values in third location through fifteenth location of alignment register 505 are shifted into the zeroth through twelfth byte positions of vector register 507) in tandem with the LSB bytes at the beginning memory reference register being appended to the extracted alignment register values to form the user content in the vector data register of appropriate length (i.e., for a 16 byte long vector register 507, then byte values corresponding to the sixteenth through the eighteenth position located in the zeroth byte through the second position of memory reference register 506 are extracted into the thirteenth through fifteenth byte position of vector register 507). Accordingly, the first production load is based on the base address lower 4-bits (in this example embodiment) of the alignment register in conjunction with the production load data elements that are extracted to form the user contents. The contents of the first production load in the memory reference register 506 is then moved into the alignment register 508 in preparation for the second production load that will read from memory line 502. During the second production load, the contents of the alignment register 508 starting at the byte located at its nineteenth position are extracted into contents of the user vector register 510 beginning in the LSB byte locations, while the contents of the memory reference register 509 corresponding to thirty-second through thirty-fourth byte address are appended to the end of the alignment register byte corresponding to the thirty-first byte address so as to form 16 bytes including the new content of the user vector data register 510. The contents of the second production load in the memory reference register 509 are then moved into the alignment register 511 in preparation for the subsequent production load that will read from memory line 503. This iterative load operation and alignment sequencing is repeated for each read of memory line 502, 503, 504, and so on, until all targeted user data (the entire memory reference) is loaded from the memory component and properly aligned within the user vector register for subsequent processing. The memory reference address may be manually or automatically incremented by the line length for each subsequent access.

In sum, FIG. 5 illustrates how some example memory systems disclosed herein load data from the memory component 514, when the memory component 514 is byte addressable and is organized in little Endian format. In some example memory systems, an LSU always derives content from the alignment register to produce the values in the user content vector register, and after the user content is generated, the LSU always updates the alignment register with the production read content from the memory reference register. For aligned reads, (i.e., the beginning address for the targeted data is integer divisible by the memory line length), the LSU loads content of the entire alignment register directly into the user content vector register. For unaligned reads, the LSU conditionally combines content of the alignment register with the production read content in the memory reference register so as to shift the a desired portion of the alignment register data into the Least significant byte (LSB) position of the content vector register, while appending a portion of the production read content to the end of the alignment register content so as to form the user vector register content of appropriate length. In tandem with pushing out the targeted data into the user vector data register, the LSU always updates the alignment register with the previous production read content.

FIG. 6 illustrates an example, in accordance with some embodiments, of content written over time to an alignment register, a current memory reference register, and a vector register, when an example memory system performs a reverse stride aligned load. In a reverse stride operation, the memory references are issued in descending order and the address used in the memory reference can either be aligned to a memory line length (aligned memory access) or not (unaligned memory access). Accordingly, for a reverse stride memory reference, each subsequent memory reference address after the initial priming load into the alignment register is in descending order.

FIG. 6 depicts an example of a reverse stride aligned load in accordance with some embodiments. Reverse stride address pointers have differences from forward stride addressing. In forward striding the address pointer is positioned effectively at the zeroth bit of the data byte element (Least Significant Bit in a little-endian configuration), and the memory reference indexes in ascending bit, byte, or line order. For this illustration, the reverse stride memory address pointer is located at the most significant bit position of the byte being targeted, or line being referenced by the user, and the memory reference indexes in descending bit, byte, or line order. For some processing pipeline architectures sequencing a reverse stride access, the pointer may be positioned one bit past the data element being referenced. In this case where the address pointer is positioned one bit past the desired data element being referenced (i.e., targeted), the address pointer is pointing to the least significant bit of the data element indexed one byte above the targeted data, which corresponds to a data element or memory line that contains data that is not targeted by the user. Regardless of whether the address pointer in a reverse stride memory access is pointing to the fifteenth bit of the first desired data element, or the zeroth bit of the byte indexed one byte above the first desired data element, the reverse stride aligned memory read (i.e., load) sequence pre-decimates the address pointer to the subsequent address reference address so as to index the next memory line in preparation for the subsequent load.

For FIG. 6, the memory component is accessed by the Load/store unit (LSU not shown) wherein the desired data being targeted by the processor begins at the seventy-ninth byte address (i.e., where address pointer 612 in memory line 604 is located) and extends for 16 bytes through the sixty-fourth byte address (i.e., diagonal line highlight in 604). Accordingly, FIG. 6 illustrates a Reverse Stride read of 16 bytes of data beginning at the seventy-ninth byte address. Because the seventy-ninth byte address corresponds to a memory line boundary of 80 bytes, which is evenly divisible by 16, an aligned memory access technique is employed to return the desired value from memory. Note the address pointer 612 points to the fifteenth byte of the byte address '79' (assuming little Endian format). The priming load by the LSU loads the entire memory line 604 into the LSU alignment register 605 and the address pointer is appropriately decremented to memory line 603 as part of the reverse stride sequence in preparation for the first production load. The first production load by the LSU extracts memory line 603 into the current memory reference register 606 while pushing the contents of the alignment register 605 in its entirety into the Vector data register 607 (for an aligned memory access) so as to produce the desired contents for the user, where the data in Most Significant Byte (MSB) position of vector register 607 contains the first desired byte value of the targeted data from the reverse stride read. Note that the Most Significant Byte and Least Significant Byte values from memory line 604 (i.e., the seventy-ninth- and sixty-fourth-byte addresses, respectively) are located in the Alignment register 605 following the priming load, and vector data register 607 at byte positions 15 and byte position 0 respectively for the first production load. The contents of the first production load in the memory reference register 606 is then moved into the alignment register 608 and the address pointer is appropriately decremented to memory line 602 as part of the reverse stride sequence in preparation for the second production load. The second production load accesses the contents memory line 602 and loads its contents into the current memory reference register 609 while pushing the contents of the alignment register 608 in its entirety into the Vector data register 610 thus producing new data for the user. The contents of the second production load in the memory reference register 609 is then moved into the alignment register 611 in preparation for the subsequent production load that will read from memory line 601. This iterative load sequence is repeated for each read of memory line 602, 601, 600, and so on, until all targeted user data (the entire memory reference) is loaded from the memory component and properly aligned within the user vector register for subsequent processing. It should be emphasized that loading a memory line into the current memory reference register, while pushing the entirety of the Alignment register contents into the user vector data register, is characteristic of an aligned memory access whether using reverse stride or forward stride addressing sequencing. The memory reference address may be manually or automatically incremented by the line length for each subsequent access.

In sum, FIG. 6 illustrates how some example memory systems disclosed herein load aligned data from the memory component 614 in reverse stride, when the memory component 614 is byte addressable and is organized in little Endian format. For this case of an aligned load operation, the entire alignment register associated with the LSU is loaded directly into the user content vector register to produce the values in the user content vector register. After the priming load, the address index (i.e., Address Pointer 612) is decremented to the next memory line byte address and the data is read into the Current Memory Reference register in descending order from the Most Significant byte address location where the Address Pointer is located. After the user content is loaded into the vector data register, the alignment register is subsequently updated with the production read content in the memory reference register.

FIG. 7 illustrates an example, in accordance with some embodiments, of content written over time to an alignment register, a current memory reference register, and a vector register, when an example memory system performs a reverse stride unaligned load. As in FIG. 6, the memory references are issued in descending order and the address used in the memory reference can either be aligned to a memory line length (aligned memory access) or not (unaligned memory access) when sequencing a reverse stride memory access. Accordingly, a reverse stride memory reference sequences each subsequent memory reference address after the initial priming load into the alignment register in descending order.

FIG. 7 depicts an example of a reverse stride unaligned load in accordance with some embodiments. For FIG. 7, the memory component is accessed by the LSU using a 16-byte load operation. The desired data being targeted by the processor begins at the seventy-sixth byte address (i.e., where pointer 712 in the memory line 704 is located) and extends for 16 bytes for through the sixty first byte in memory line 703 (i.e., diagonal line highlight in FIG. 7). Accordingly, FIG. 7 illustrates a reverse stride, unaligned read of 16 bytes of data beginning at the seventy-sixth address (i.e., 76, the seventy-sixth byte address, is not evenly divisible by 16). Note the address pointer arrow 712 points to the fifteenth bit of the byte at address seventy-six. The first load by the LSU is referred to as the "priming load" and functions to load the entire first memory line 704 into the LSU alignment register 705. The subsequent load by the LSU is the first production read where the LSU loads memory line 703 into the current memory reference register 706, while conjoining the appropriate contents of the alignment register 705 with the memory reference register 706 so as to produce the desired contents for the user in vector register 707, where the data in Most Significant Byte (MSB) position of vector register 707 contains the first desired byte value of the targeted data. Specifically for this example, during a reverse stride production read the LSU extracts the contents of the alignment register into the user content vector register such that the Most Significant byte (MSB) in the vector register correlates to the MSB of the targeted data (i.e., byte values in the twelfth through zeroth byte location of alignment register 705 are shifted into the fifteenth byte through the third location of vector register 707) in tandem with the MSB bytes in memory reference register 706 being appended to the extracted alignment register values to form the user content in the vector data register 707 of appropriate length. This means that for a 16-byte long vector register 707, the byte values at the thirty-first through twenty-ninth byte locations of vector register 706, corresponding to the sixty-third through sixty-first byte address of memory reference, are extracted into the second through zeroth byte positions of vector register 707. The contents of the first production load in the memory reference register 706 is then moved into the alignment register 708 and the address pointer is appropriately decremented to memory line 702 as part of the reverse stride sequence in preparation for the second production load. During the second production load, the contents of the alignment register 708 beginning at the twenty-eighth byte location are extracted in descending order into the contents of the user vector register 710, while the contents of the memory reference register 709 corresponding to MSB byte address of the forty-seventh through forty-fifth locations are appended in descending order to the end of byte 48 (pushed into vector data register content 710 from Alignment register 708) so as to complete a 16-byte word within the user vector data register 710. The contents of the second production load in the memory reference register 709 is then pushed into the alignment register 711 in preparation for the subsequent production load that will read from memory line 701. This iterative load operation and alignment sequencing is repeated for each read of memory line 702, 701, 700, and so on, until all targeted user (the entire memory reference) is loaded from the memory component using reverse stride sequencing and properly aligned within the user vector register for subsequent processing. The memory reference address may be manually or automatically incremented by the line length for each subsequent access.

In summary, FIG. 7 illustrates one example of a reverse stride, unaligned memory access in accordance with some embodiments, where the data in a memory component is byte addressable and is organized in little Endian format. For this unaligned load operation, the alignment register is conditionally combined with the production read content in the memory reference register so as to right-shift the desired portion of the alignment register data into the Most significant byte (MSB) position of the content vector register, while appending the appropriate portion of the production read content to the end of the alignment register content so as to form the user vector register content of appropriate length. In tandem with pushing out the targeted data into the user vector data register, the alignment register is always updated with the previous production read content.

Figure 8:
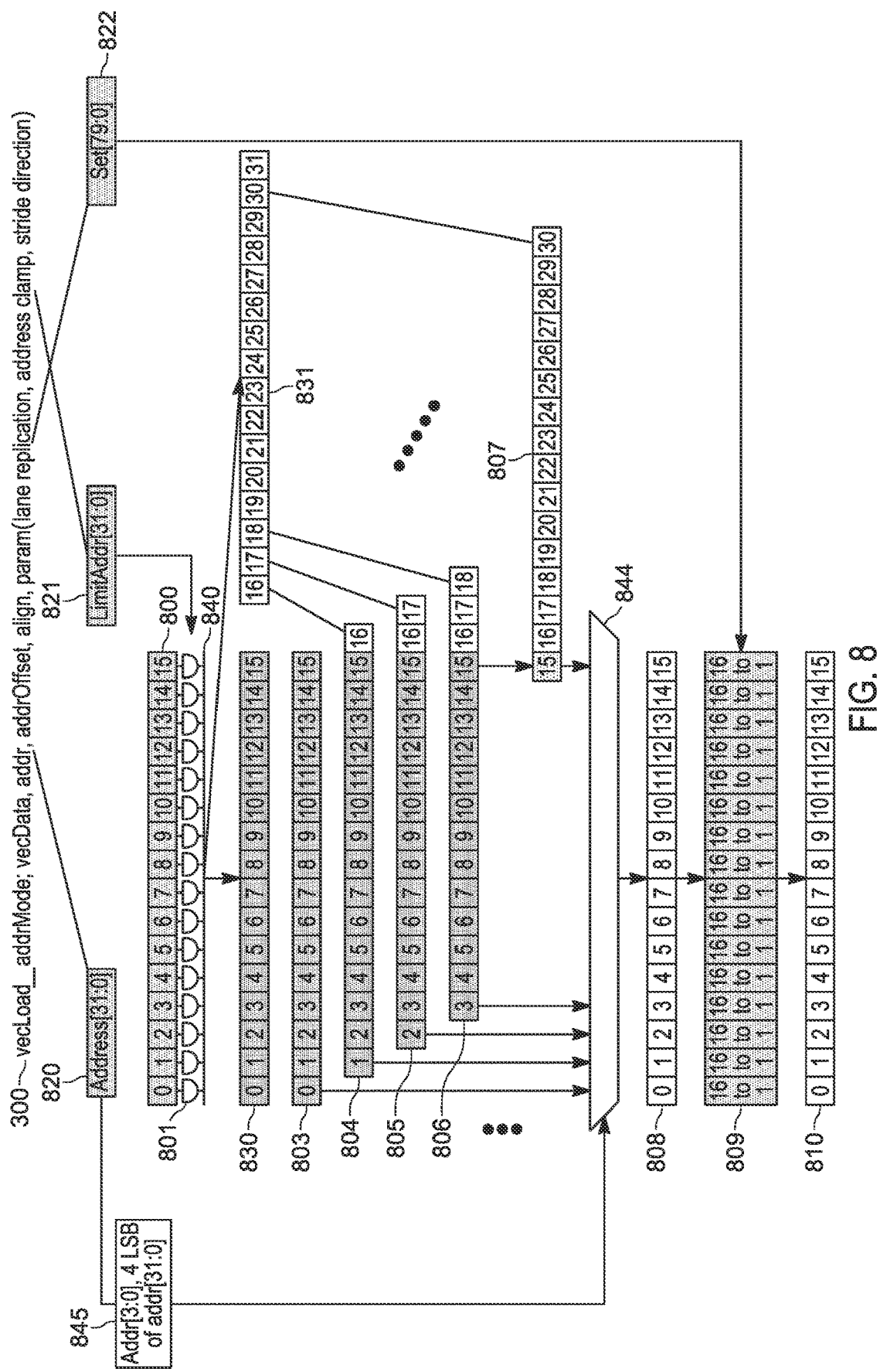
FIG. 8 is a block diagram of a memory system performing a forward stride load from a memory.

FIGS. 8 through 15 depict example logic diagrams of components of memory systems in accordance with some embodiments. Some of the depicted components may be in a load and store unit, a memory, neither, or both. These figures depict components of the memory systems and also data produced by the components FIG. 8 depicts an example forward stride unaligned load memory access with address clamping and lane replication logic in accordance with some embodiments. FIG. 8 illustrates the logic sequence for a forward stride memory load as described in FIG. 5. In addition, the instruction word 300 of FIG. 3 incorporates operands that map into the logic block diagram of FIG. 8. For example, instruction word 300 would incorporate an appropriate opcode to activate the logic structure of FIG. 8, with operands 'addr', 'address clamp,' and 'lane replication' being mapped to address register 820, limit address register 821, and selection control register 822 respectively. For unaligned load operations, the address clamping gates 801 in combination with an address limit register 821 returns data-elements up to the specified address in the limit register 821. Any data element having an address greater than or equal to a specified address limit value in limit register 821, as indexed from the memory line access being read from the memory component, is intercepted and replaced (i.e., clamped) with a ZERO value. Memory reference 800 represents byte addressable memory elements accessed from the memory component, each data element (i.e., byte) being indexed with a unique byte address, and below 800 is a clamping logic block 801 represented by an array of AND gate logic symbols. Each AND gate within AND gate array 801 is assigned to a corresponding data element from the memory reference register 800. Based on the address in 820 and the limit address register 821, when the byte address of the memory reference data elements 800 reaches the address limit value, a disable signal is generated to "zero" the data element for that individual data lane. The output of the AND gate array 801 connects to data transport bus 840 which in turn connects to the alignment register 830 and the Current memory Reference Register 831. For the purposes of this discussion, a data lane is agnostic to the actual data element value but refers to the data element location within the Memory reference register 800, which may in turn correspond to the same byte location in the normalize register 808. For FIG. 8, the zeroth lane corresponds to the zeroth byte position in memory reference register 800 which also correlates to the zeroth position in the normalized register 808. The fifteenth lane corresponds to the fifteenth byte position in memory reference register 800 which also correlates to the fifteenth byte position in the normalized register 808. The values in a given lane may change when processing data elements from register 800, through the Alignment Multiplexer sequence (to be described later), which is subsequently pushed into the normalized register 808; however, there are fixed lane references that reference a data element position from register 800 to register 808 at the output of the Alignment multiplexor ("mux") 844.

For priming loads, the contents of the memory reference 800 are transferred into the alignment register of 830. For memory accesses designated as first production load, the contents of the memory reference 800 are pushed into the current memory reference register 831. For each subsequent production load, the legacy contents of reference register 831 are pushed into the alignment register 830 in tandem with the newly acquired contents of memory reference 800 being transported into the register 831. After the alignment register 830 and Memory Reference Register 831 are loaded with their new values following a production read, a series of tandem, cascaded, single byte left shift operations are automatically performed to produce sixteen subset vectors into the alignment multiplexer 844. Specifically, each subset vector (or "input" vector) into mux 844 includes 16 data elements (i.e., bytes), wherein each vector's alignment register constituent elements are left shifted by one byte from the preceding vector, and a new byte is "shifted in" to the MSB position from the reference register LSB positions in incrementally ascending (for a forward stride access) indexed order. These alignment vectors into the mux 844 are referred to as Alignment Subset vectors and are exemplified in subset vectors 803, 804, 805, 806 and 807. Accordingly, Subset Vector 803 contains all data elements in alignment register 830 and is indicative of an unshifted read (i.e., memory line aligned); Subset Vector 804 left-shifts vector 803 one data element while shifting in the LSB byte from the reference register 831; Subset Vector 805 left-shifts vector 804 by one data element while shifting in the incrementally indexed LSB byte 17 from the reference register 831. This tandem sequencing is repeated until the final Subset Vector 807 is formed by left-shifting the preceding vector subset (not shown) one data element while shifting in the incrementally indexed LSB byte 30 from the reference register 831. Accordingly, FIG. 8 depicts subset vectors shifted from other subset vectors. For example, the subset vector 805 is left shifted from the subset vector 804. A most significant data element portion of the subset vector 804 is derived in order from a least significant data element portion of the current memory reference register 831. And a least significant data element portion of the subset vector 805 (the first fourteen data elements of subset vector 805) is derived in order from a most significant data element portion of the alignment register 830. The least significant and most significant data element portions can be any size less than the size of the subset vectors. As shown, the subset vector 805 is shifted by a number of left shift data elements—two. The number of left shift data elements is equal to a number of data elements of the least significant data element portion of the current memory reference register 831 (two). The direction of shift, and the specific contents from which registers the subset vectors are generated may be based on the operating direction of stride. For example, the subset vectors may be generated as just described when a stride operand of an instruction word indicates forward stride. The alignment mux 844 output vector will be selected from one of the 16 subset vectors using the alignment mux control signal as illustrated in FIG. 8.

The alignment Mux control signal from alignment select logic 845 is determined based on the modulus of the base address (i.e., the lower log 2(memory-line-length) bits of the base address). This control signal is used to control the Alignment multiplexer 844 to select the user content that is stored in the normalized register 808. In other words, if the memory line length is 16 bytes, and the alignment register, and memory reference register is also 16 bytes long, then log 2(16) is 4, meaning that the lower four bits of the address vector 820 is processed by Alignment mux select 845 to control multiplexer 844. The output of the Alignment mux 844 is pushed into the normalized register 808; register 808 corresponds to the user vector data register contents 507 and 510 in FIG. 5. By way of example, if the modulus bits are ZERO, then the alignment mux control output from 845 is set to zero, which selects vector subset 803. Subset vector 803 corresponds to an aligned 16 byte read, where subset vector 803 contains the entirety of the alignment register 830, which is then ported through alignment mux 844 into the normalized register 808. If the modulus is other than ZERO, then a combination of data elements from alignment register 830 and memory reference register 831 is used to produce the user content in a manner previously described above. For example, the alignment register 830 and memory reference register 831 contain register contents derived from a memory component based on the pointer to a memory reference (as described, for example, in FIG. 5). Subset vector 806, for example, may then correspond to a 16-byte vector ranging from a third byte address to an eighteenth byte address of a memory component 514 of FIG. 5 (as indicated in the shaded area in memory lines 500 and 501 and produced in the user vector data register content 507 of FIG. 5). The output of the multiplexer stage is placed in register 808, thereby producing the first production read user vector data register content (507 in FIG. 5). For the subsequent production reads, the process is iteratively repeated whereby the previous value of reference register 831 becomes the new values in the Alignment register 830 (i.e., alignment register content 508 and 511 of FIG. 5 for the second and third production reads respectively), and the lower 4 bits of address register 820 will again select item subset vector 806 (for a 16 byte forward stride read) as the desired output from alignment mux 844. Subset vector 806 will continue to produce values for subsequent production reads (e.g., the second production read will produce 510 of FIG. 5). Consequently, the alignment register 830 may always be used to produce the desired values pushed into the normalized register 808. The normalized register 808 may be subsequently processed by the lane selection mechanism 809 which produces the final product 810.

Normalized Data register 808 in this embodiment contains 16 data-elements, each data element being a byte of 8-bits in length. The lane replicator block 809 in this embodiment contains 16 corresponding output lanes, each output being directly connect to the corresponding register location in the user current content register 810. The user current content register 810 may be referred to as a current content register and may be the same register as the current memory reference register of other figures. Each of the 16 positions of replicator 809 incorporates a 16 input-to-1 output multiplexer; therefore, each of the 16-byte positions (i.e., lanes) of normalized register 808 are connected to each input port of any given 16:1 multiplexer. In other words, the input to the zeroth byte of register 808 is connected to the zeroth input port of each of the sixteen multiplexers incorporated into each byte position in replicator 809. The first byte of register 808 is connected to the first input port of each of the sixteen multiplexers incorporated into each data lane (i.e., byte position) of replicator 809 and so on. An additional Lane control register 'Sel[79:0]' 822 is utilized to control the select signals to each multiplexer lane of 809. Each of the 16 multiplexer lanes operates identically from one another as each multiplexer lane has a dedicated select signal from the control register Sel[79:0]'. In some example embodiments, lane control register 822 is partitioned into bit groups to drive the multiplexer select signals. A single 16:1 multiplexer can contain one enable bit per multiplex port or a single encode value. In some embodiments, an encoded 4-bit value is used to select one of 16 sources from register 808 as an input signal for a single multiplexer lane output signal. Sixteen channels in 809 times 4-bits of multiplexer control per channel equals 64 bits of control. There are an additional set of control signals in Control register 822, 16 additional bits in this embodiment, which further specify a behavior of the lane multiplexer. These additional control bits, either allows the multiplex value to propagate to the output or sets the output of the lane to ZERO. Thus the lane selection logic of 809 can place any data element of 808 into any lane of 810 via the multiplexer in 809. In addition to this lane rearranging (i.e.; replicator) function, each individual lane can be cleared to produce a ZERO byte value in any given individual data lane as set by the 16 additional control bits previously described.

In FIG. 8, the memory reference accesses 16-byte lanes from memory and produces a final data vector of 16 data elements. In some embodiments, a "narrow memory access" can be expanded into a larger data vector. A narrow Memory access is a memory read where the memory line length of the memory component being accessed is shorter (i.e., has fewer data elements) that the LSU alignment register and memory reference register length. Accordingly, some embodiment of a narrow memory access may expand a smaller width vector loaded from memory into a larger vector by strategically positioning the loaded data within the user current content register 810. A use case for this embodiment is reading a memory line as 'real' values from a packed array and converting them to properly formatted 'complex' numbers for subsequent processing. For example, 8 data elements representing eight real numbers may be read and process so as to be located in byte positions 0 through 7 of normalized registers 808. Replicator 809 may then be configured to route data elements 0 through 7 of 808 into only even numbered lanes in Content Register 810 (i.e. register 808 byte zeroth, first and second byte positions are routed to the zeroth, second and fourth byte positions of register 810, and so on) while forcing "0" logic value into the odd byte positions of Content register 810. In this manner, an 8 byte real only vector may be interleaved with values to form a paired number set for each original real number, thereby conforming to a complex number format where the imaginary component is zero. In some embodiments, a wide memory vector (for example 16 data elements) can be accessed from memory to produce a narrow data vector at the Content Register 810. A use case for this embodiment would be reading a 'complex' value of paired number vectors from a packed array and extracting only the 'real' data element of each complex pair thereby producing a data vector half as long as its original length.

Figure 9:
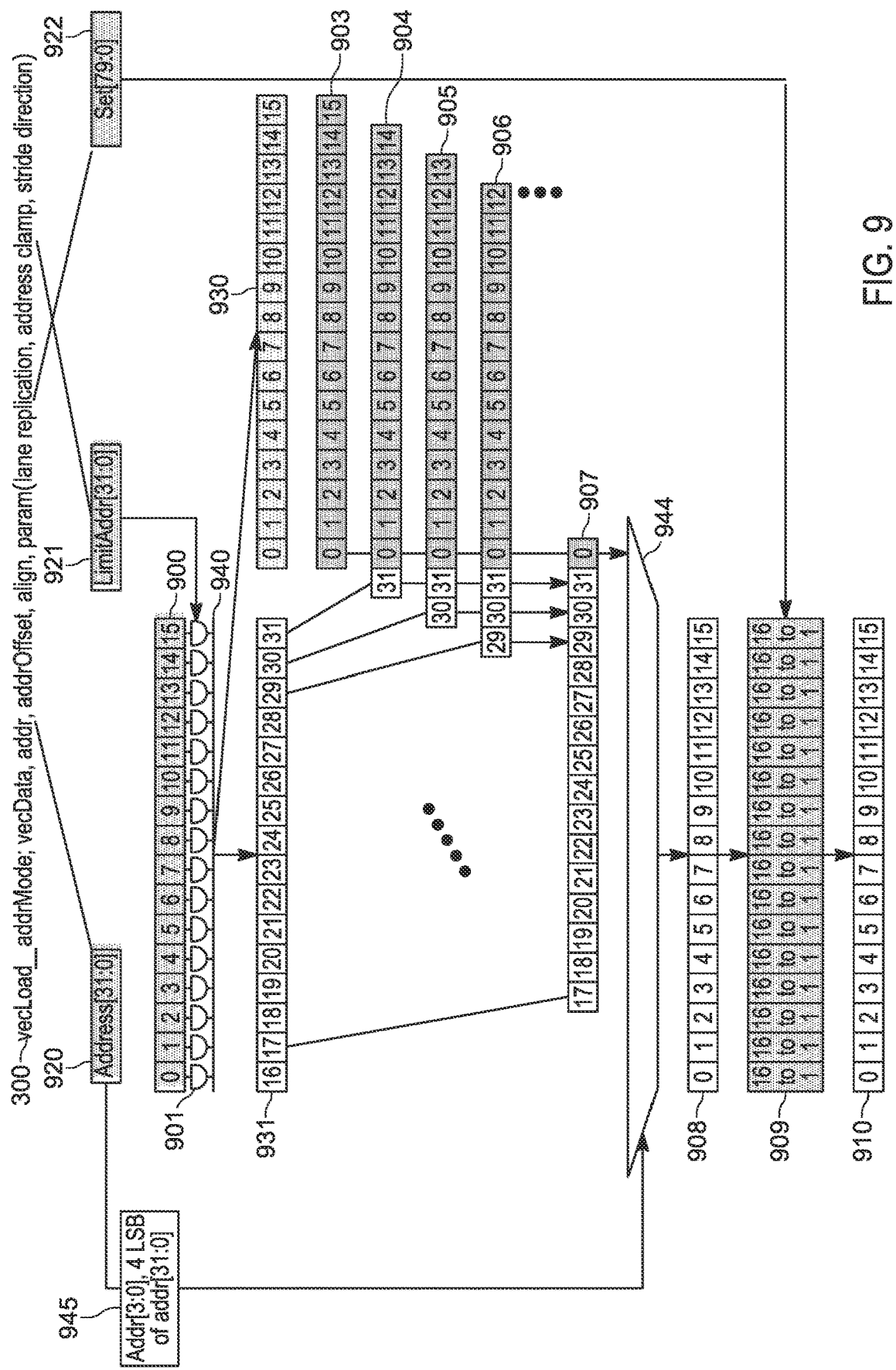
FIG. 9 is a block diagram of a memory system performing a reverse stride load from a memory.

FIG. 9 illustrates an example reverse address striding load from a memory component in accordance with some embodiments. For a Reverse Stride memory access, the alignment register and memory reference register have swapped positions. The alignment multiplexer 944 used to select the data elements begins from the opposite direction as compared to forward striding. Specifically, FIG. 9 illustrates the logic sequence for a reverse stride memory load as described in FIG. 6 and FIG. 7. The instruction word 300 of FIG. 3 may be used to control the reverse stride memory access. In addition, the address clamping gates 901 in combination with an address limit register 921 returns data-elements up to the specified address in the limit register 921. Any data element having an address less than or equal to a specified address limit value in limit register 921, as indexed from the memory line is descending order, is intercepted and replaced (i.e., clamped) with a ZERO value. Memory reference 900 represents byte addressable memory elements accessed from a memory component, each data element having a dedicated clamp in clamping logic block 901. Based on the address in 920 and the limit address register 921, when the byte address of the memory reference data elements 900 is decremented to the address limit value, a disable signal is generated to "zero" the data element for that individual data lane. The output of the AND gate array 901 connects to data transport bus 940 which in turn connects to the alignment register 930 and the Current memory Reference Register 931. The same lane naming convention for FIG. 8 is directly applicable to FIG. 9. The values in a given lane may change when processing data elements from register 800, through the Alignment Multiplexer sequence, which is subsequently pushed into the normalized register 908.

For reverse stride priming loads (i.e., reads), the contents of the memory reference 900 are transferred into the alignment register of 930. The first reverse-stride production load pushes the contents of the memory reference 900 into the current memory reference register 931. For each subsequent production load, the legacy contents of reference register 931 is pushed into the alignment register 930 in tandem with the newly acquired contents of memory reference 900 being transported into the register 931. After the Alignment and Memory Reference Registers are loaded with their updated values following a production read, a series of tandem, cascaded, single byte, right-shift operations are automatically performed to produce sixteen subset vectors into the alignment multiplexer 944. Specifically, each subset vector into mux 944 includes 16 data elements, wherein each vector's alignment register constituent elements are right shifted (for reverse stride) by one byte from the preceding vector, and a new byte is "shifted in" to the LSB position from the reference register MSB position in incrementally descending (for a reverse stride access) indexed order. These alignment vectors into the mux 944 are exemplified in Subset vectors 903, 904, 905, 906 and 907. Vector 903 contains all data elements in alignment register 930 and is indicative of an unshifted read (i.e., memory line aligned); however, subsequent subset vectors for a reverse stride read are generated by right shifting the alignment register components. Therefore, Subset Vector 904 right-shifts vector 903 one data element while shifting in the MSB byte from the reference register 931; Subset Vector 905 right-shifts vector 904 by one data element while shifting in the incrementally indexed MSB byte 30 from the reference register 931. This tandem right-shift sequencing is repeated until the final Subset Vector 907 is formed by right-shifting the preceding vector subset (not shown) one data element while shifting in the incrementally indexed MSB byte 17 from the reference register 931. Accordingly, FIG. 9 depicts subset vectors shifted from other subset vectors. For example, the subset vector 905 is right shifted from the subset vector 904. A least significant data element portion of the subset vector 904 is derived in order from a most significant data element portion of the current memory reference register 931. And a most significant data element portion of the subset vector 905 (the last fourteen data elements of subset vector 905) is derived in order from a least significant data element portion of the alignment register 930. The least significant and most significant data element portions can be any size less than the size of the subset vectors. As shown, the subset vector 905 is shifted by a number of right shift data elements—two. The number of right shift data elements is equal to a number of data elements of the most significant data element portion of the current memory reference register 931 (two). The direction of shift, and the specific contents from which registers the subset vectors are generated may be based on the operating direction of stride. For example, the subset vectors may be generated as just described when a stride operand of an instruction word indicates reverse stride. The alignment mux 944 output vector will be selected from one of the 16 subset vectors using the alignment mux control signal. The alignment mux 944 output vector will be selected from one of the 16 using the alignment mux control signal as illustrated in FIG. 9.

The Alignment Mux control signal from Alignment select logic 945 is determined based on the modulus of the base address (i.e. the lower log 2(memory-line-length) bits of the 32-bit base address 920). This control signal is used to control the Alignment multiplexer 944 to select the user content that is stored in the normalized register 908. Note that register 908 corresponds to the user vector data register contents 607 and 610 in FIG. 6 for aligned memory reads, or 707 and 710 in FIG. 7 for unaligned memory reads, as indicated in the modulus of the base address. By way of example, if the modulus bits are ZERO, then the alignment mux control output from 945 is set to zero, which selects subset vector 903. Subset vector 903 corresponds to an aligned 16 byte read located in the alignment register as represented in alignment register content 605 of FIG. 6. For the reverse stride, aligned first production load, subset vector 903 is ported through alignment mux 944 into the normalized register 908 (as shown by vector data register content 607 of FIG. 6). For the second reverse stride production read, the contents of alignment register 930 are updated with the legacy reference register 931 data elements (i.e., alignment register 930 has contents 608 of FIG. 6), and modulus bits of ZERO set the alignment mux 944 to produce subsequent user content values which are pushed into the normalized register 908 of FIG. 9 (as shown by vector data register content 610 of FIG. 6).

For unaligned reverse stride memory loads, (i.e., the modulus is not equal to ZERO), a combination of data elements from alignment register 930 and memory reference register 931 is used to produce the user content. For example, the alignment register 930 and memory reference register 931 contain register contents derived from a memory component based on the pointer to a memory reference (as described, for example, with a pointer 712 at a seventy-sixth address in FIG. 7). Subset vector 906, for example, may then correspond to a 16 byte vector ranging from a sixty-first to a seventy-sixth address of a memory component (as indicated in the shaded area in memory lines 703 and 704 and produced in the user vector data register content 707 of FIG. 7). In other words, subset vector 906 corresponds to an unaligned 16 byte read, where the alignment register 930 has been right-shifted by 3 bytes, (i.e., positioning the twelfth byte location in the MSB byte position), while simultaneously shifting in the three MSB byte values from the memory Reference register 931 (i.e., the twenty-ninth, thirtieth, and thirty-first byte positions) into the vector subset 906 LSB position. The output of the multiplexor stage is placed in register 908 thereby producing the first production reads. For the subsequent production reads, the process is iteratively repeated whereby the previous value of reference register 931 becomes the new values in the Alignment register 930 (i.e., alignment register content 708 and 711 of FIG. 7 for the second and third production reads respectively), and the lower 4 bits of address register 920 will again select item subset vector 906 (for a 16 byte reverse stride read) as the desired output from alignment mux 944. Subset vector 906 may continue to produce values for subsequent production reads (e.g., the second production read will produce 710 of FIG. 7). Consequently, the alignment register 930 may always be used to produce the desired values pushed into the normalized register 908. The normalized register 908 may be subsequently processed by the lane selection mechanism 909 which produces the final product 910.

As described above for the lane selection logic in FIG. 8, the lane selection logic 909 can place any data element of 908 into any lane of Content Register 910 via the multiplexer in 909.

Figure 10:
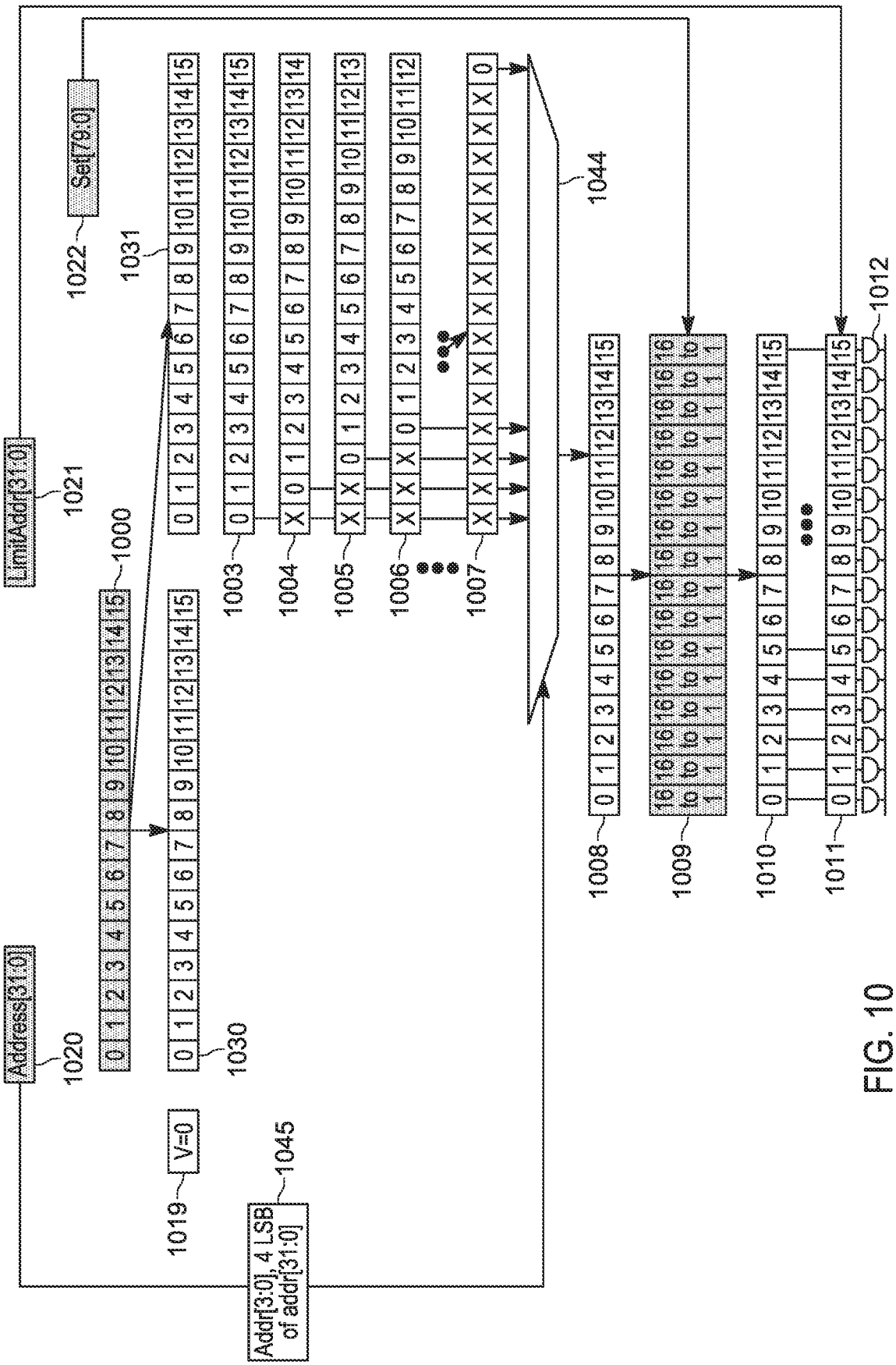
FIG. 10 is a block diagram of a memory system performing a forward stride initial store to a memory.
Figure 11:
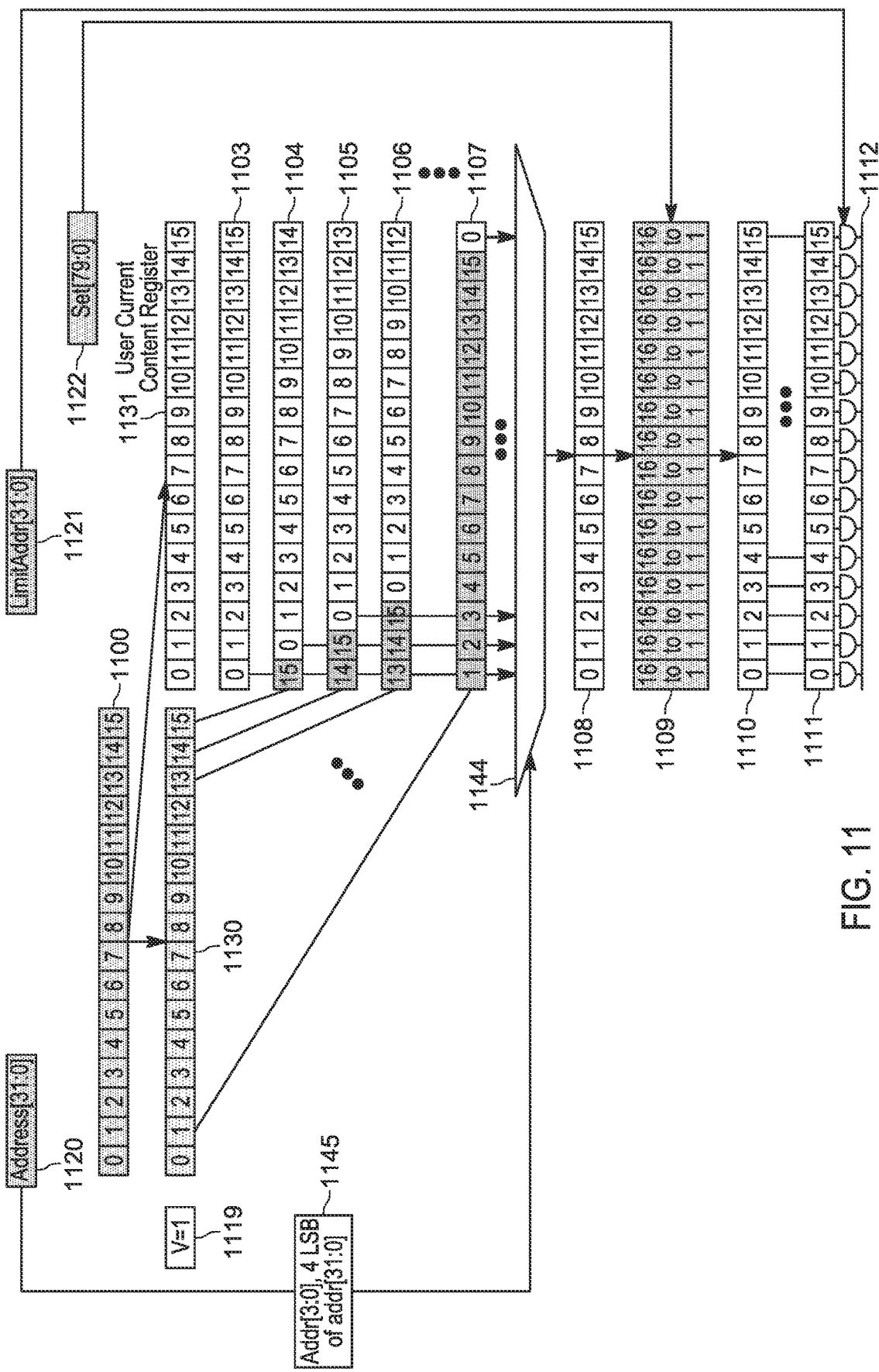
FIG. 11 is a block diagram of a memory system performing a forward stride, unaligned nth store to a memory.
Figure 12:
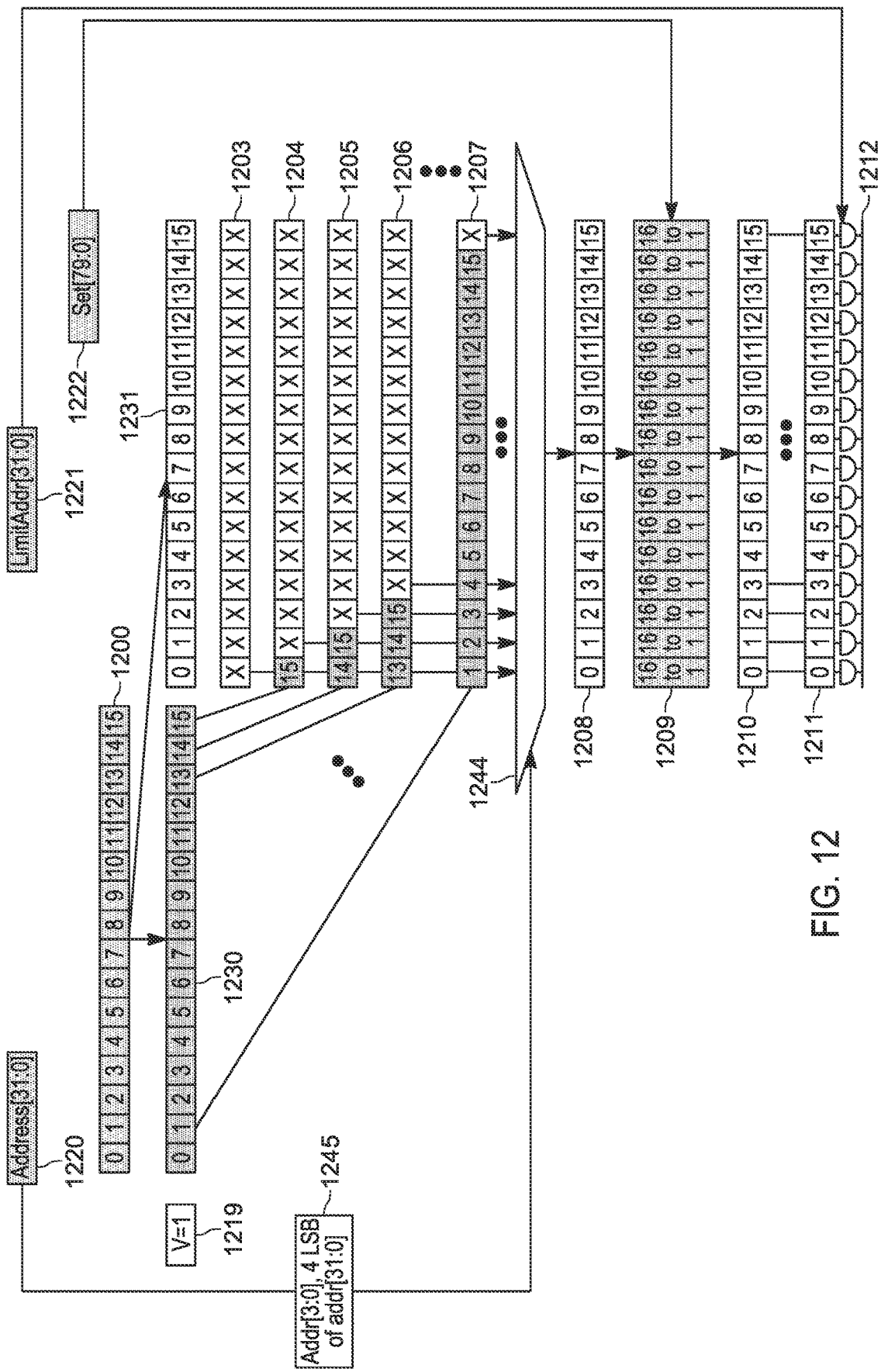
FIG. 12 is a block diagram of a memory system performing a forward stride, unaligned last store to a memory.

FIG. 10, FIG. 11 and FIG. 12 describe the sequences and apparatus for an aligned or unaligned, forward stride store operations (i.e., data written to a memory component). Forward Stride store (i.e., write) operations are the complement function to the previously described forward stride load (i.e., read) operation. Unaligned store operations are particularly problematic given that partial memory line writes have the opportunity of corrupting data-elements that may be located in the memory line being accessed but have addresses that are located outside the targeted write address regions. To mitigate this memory corruption vulnerability, some memory write sequences employ a read/modify/write operation wherein an unaligned write operation is first preceded by a read of the memory line containing the memory address for the store operation, after which the memory line contents are appropriately modified to update the targeted unaligned memory reference while not changing those data elements residing outside of the designated address range, followed by a final write of the new (i.e., updated) memory line containing the undated data information. This read/modify/write sequence is inefficient in that every write to a memory line is accompanied by a read access, thereby doubling the actual memory component accesses when performing a single write operation. An alternative to the read/modify/write sequence is incorporated in the present embodiment, wherein individual specific bytes, or data-element enable signaling, is incorporated into memory line addressing and is designed into the physical memory component structures. These address-specific enable signals allow only the targeted bits or data-element(s) to be stored into the memory component, so as to facilitate a store operation that can write to targeted data-elements in a partial memory line without corrupting untargeted data-elements. This unaligned store operation with address specific data-element enable signaling is realized in the present embodiment with address clamping and lane replication during the unaligned operations. Specifically, the address clamping gates 1012, 1112, and 1212 in FIG. 10, FIG. 11 and FIG. 12, in combination with address limit register 1021, 1121, and 1221, targets those data-elements that are to be masked out of the physical write to the memory component (not shown). For a Forward stride first store access to memory, any data element having an address less than or equal to a specified address in limit register 1021 of FIG. 10, as indexed from the memory line in ascending order, is masked out. For a forward stride final store access to memory, any data element having an address greater than or equal to a specified address in limit register 1221 of FIG. 12, as indexed from the memory line in ascending order, is masked out. Masking a data element functions to intercept that particular element and prevent it from being written into memory so that said data element does not corrupt extant data that resides outside of the targeted address range.

FIG. 10 illustrates an example forward stride store (i.e., write) operation during the first write access to a memory component in accordance with some embodiments. When a first write access to a memory component is initiated by a store operation, the "V bit" 1019 is set to a logic zero. For subsequent store events affiliated with an unaligned store operation, bit V 1019 is set to logic high. During a store operation, the store operand presents a full memory line value that is to be stored into a memory component in user current content register 1000. The targeted address designating the location in memory where the user content data is to be stored is specified in virtual address register 1020; however, for the forward stride store operations the address value in register 1020 does not have to be aligned to an integer multiple of the memory component line length and may point to any data-element's position in a targeted memory line. Unlike an unaligned load operation, the unaligned store operation requires no priming operations whereby data elements are stored into the alignment register 1030. For Store operations, data-elements may always be stored to the memory component on the first access. This is accomplished by first loading the data in content register 1000 into the Current content Register 1031. Once Register 1031 is loaded with its new values, a series of tandem, cascaded, single byte right-shift operations are automatically performed to produce sixteen subset vectors into the alignment multiplexer 1044. Specifically each subset vector into mux 1044 includes 16 data elements (i.e., bytes), wherein each vector's Reference register constituent elements are right shifted by one byte position (i.e., lane) from the preceding vector, and for a first write access (i.e., bit V=0) each byte lane previously having the value of current content register 1031 is set as "don't care" (i.e., "x") in incrementally ascending byte lane order. These alignment vectors into the mux 1044 are referred to as Store Subset vectors and are exemplified in subset vectors 1003, 1004, 1005, 1006 and 1007. Accordingly, for a forward stride first store operation, Subset Vector 1003 contains all data elements in current content register 1031 and is indicative of an unshifted or aligned (i.e., memory line aligned) store/write event; Subset Vector 1004 right-shifts vector 1003 by one data element while setting the LSB lane position to a "x" indicating an undefined state at that data element location; Store Vector 1005 right-shifts vector 1004 by one data element while setting its two least significant positions to an "x" indicating an undefined state for those data element positions. This tandem sequencing is repeated for the first store operation until the final Subset Vector 1007 is formed by right-shifting the preceding vector subset (not shown) one data element while setting lanes for the zeroth location through the fourteenth location to an "x" indicating an undefined state for those data element locations. For Subset vector 1007, only the first byte value from user current content register 1031 remains, being located the fifteenth byte lane (i.e., MSB byte position); all other byte positions are flagged as don't care states. Accordingly, subset vector 1007 corresponds to an unaligned store operation where value for the zeroth byte of user content register 1000 is to be stored into the fifteenth memory byte position. The shifting may be based on a stride operand, wherein when the stride operand indicates forward stride, the subset vector 1005 is right shifted from the subset vector 1004. The subset vectors may be generated through other techniques, such as those described elsewhere herein.

It is apparent that for the first forward stride store operation to a memory component, the alignment register 1030 may not be utilized; however, the alignment register 1030 may be utilized during subsequent memory line writes that may be part of a contiguous series of memory store operations, as will be described is FIG. 11 and FIG. 12. The alignment mux 1044 output vector will be selected from one of the 16 subset vectors using the Alignment mux control signal generated by the Alignment select logic 1045.

As in the case for a forward stride load from memory described in FIG. 8, the Alignment Mux control signal from logic block 1045 for a forward stride store operation in FIG. 10 is determined based on the modulus of the base address (i.e. the lower log 2(memory-line-length) bits of the base address). Like loading, the alignment mux 1044 may select any of the subset vectors for storing. For example, if the first fifteen elements of the user content register are to be stored in a memory line of the memory, then the alignment mux 1044 may select vector subset 1004. The output of the multiplexer 1044 is placed in register 1008, thereby producing the contents for the first write to the memory component. Subsequent store operations and the last store operation, that taken together include a full store sequence, are described in FIG. 11 and FIG. 12.

Following the normalized data register 1008 in this embodiment, is the lane replicator logic 1009, wherein each byte lane position is accessible by 16 input sources lanes, each output lane 0 through lane 15 being directly connect to the correspond register location in the memory reference register 1010. Each of the 16 positions of replicator 1009 incorporates a 16 input-to-1 output multiplexer; therefore, each of the 16 byte positions (i.e., lanes) of normalized register 1008 are connected to each input port of any given 16:1 multiplexer in replicator 1009. Select Register 1022 is utilized to control the select signals to each multiplexer lane of 1009. Each of the 16 multiplexer lanes may operate identically from one another as each multiplexer lane has a dedicated select signal from the Control Register Sel [79:0]' 1022. The lane replicator control for a store operation in FIG. 10 is similar to that as described for load operations for FIG. 8, in that 4 bits are used to control each of the 16 multiplexers in the lane replicator 1009, each encoded 4-bit value selecting one of 16 input sources from register 1008 as an output signal for a single multiplexer lane output to Memory reference register 1010. In addition to the 64 bits of encoded control signaling (4 bits×16 byte lanes produces 64 bits allocated for input signal selection) there are 16 additional bits in Control register 1022, which may be used to enable the multiplex value to propagate to the appropriate output lane in the memory reference 1010, or alternatively set the output of a given lane's byte value to ZERO.

For forward stride store operations, the address masking gates 1012 in combination with an address limit register 1021 are used to generate the appropriate mask for the first store operation. Specifically, for the first forward stride store operation, any data element having an address less than or equal to a specified address limit value in limit register 1021, as indexed for the memory line being written to in the targeted memory component, is intercepted and that byte's lane mask is set to disable the active write for that particular byte address. Byte Lane control register 1011 represents byte addressable memory elements access from the memory reference register 1010, whereby each data lane is indexed with a unique byte address. Below lane control 1011 is a Data masking logic 1012 represented by an array of AND-gate logic symbols. Each AND gate within AND gate array 1012 is assigned to a corresponding data element position (i.e., lane) from the memory reference register 1010. Based on the address in 1020 and the limit address register 1021, when the memory line byte address for the data elements in memory register 1010 are below the address limit value in 1021, a write disable signal (i.e., mask) is generated to prevent that particular data element from being written to the memory component. The output of the AND gate array 1012 connects to the memory component (not shown) which is being accessed in the data store operation. Consequently, in the case of the address modulus of 'zero', the entire user current content register 1031 is transferred into Memory Reference register 1010 and subsequently stored to memory (assuming appropriate configuration for limit and lane selection registers 1021 and 1022 respectively). After the first store iteration, the user current content register values 1031 is then transferred to the alignment register 1030 whereby the V bit 1019 is set logic high if data-elements in register 1031 have not been stored to memory (i.e., the store operation was an unaligned write). In the case where the address modulus equals zero (i.e., the store operation is an aligned write where subset vector 1003 is always selected) the residual V bit 1019 remains clear for the first store operations, and all subsequent store operations.

By way of example, if the targeted write in address register 1020 produces an address modulus of "3" for the first data store operation, store vector 1006 is loaded into normalized register 1008 through alignment mux 1044, thereby positioning the zeroth byte of current content register 1031 into the third byte lane position of register 1008, in tandem with setting undefined "x" don't care states in the first three LSB byte lanes of the same register 1008. Assuming the lane replicator 1009 is set to directly pass through all byte value from 1008 to the same lane positions in memory reference register 1010, then the data elements in register 1010 are correctly shifted so as to correspond to the targeted address location in the memory component. During the actual store operation, the store address pointer begins at the first data element of the memory line containing the targeted write address; however, the data mask produced by masking logic 1012 prevents those initial byte locations from being written to. In other words, for an address modulus of '3' derived from address register 1020, the limit address loaded into 1021 may be indexed to mask the first three lanes in byte lane control 1011 to prevent those address locations residing outside of the write address range from being written to (i.e., corresponding to those lanes that contain a "x" in memory reference register 1010). After the first unaligned store operation having an address modulus of '3,' the V bit is set to logic high thereby indicating that there were byte values in current content register 1031 that were not written to memory during the first write iteration. It becomes apparent that values in write address register 1020, limit address register 1021, replicator lane selection register 1022, and the address modules selection that sets the output of the alignment mux 1044, must all be properly managed so as to produce a first store operation that appropriately masks out those byte lanes that are not targeted for a memory write, while ensuring the appropriate byte values are written to the correct memory address locations within the memory component. These index values in registers 1020, 1021, and 1022 may be manually updated or automatically managed after each successive write to a memory line based on the legacy index values from the preceding store iteration and the particular memory line length for the targeted memory component.

FIG. 11 illustrates an example forward stride store (i.e., write) operation during subsequent write accesses to a memory component following a first write access (illustrated in FIG. 10), wherein the V bit 1119 has been set to logic high. Note that Vbit 1119 in FIG. 11 correlates to Vbit 1019 on FIG. 10. As described in FIG. 10, the Vbit 1119 is set logic high in a first write operation only when there are residual data elements in the current content register 1031 (which also correlates to register 1131 in FIG. 11) that have not been written to memory. In other words, the Vbit is set logic high only for unaligned store operations; therefore, FIG. 11, is one embodiment whereby the address register 1120 (which correlates to register 1020 in FIG. 10) indexes the store operation to write the user content vector 1100 to a memory location that is not aligned with the memory line length (i.e., the address modulus is not equal to zero). When Vbit 1019 of FIG. 10 (i.e., 1119 of FIG. 11) is logic high, the legacy data of User current content register 1031 (i.e., correlates to 1131 of FIG. 11) has been copied into the Alignment register 1130 (correlates to 1030 of FIG. 10) at the end of the first store operation. At the end of all subsequent writes to memory following the first store, the data elements of content register 1131 are pushed into the alignment register 1130 so as to capture those data elements from a previous store that may not been written to memory. In other words, saving the user data elements from a prior write facilitates the current (i.e., active) store operation in capturing those data elements that have not been written to memory during a previous unaligned write. Consequently, when Vbit=1, the content of memory Reference register 1110 that is to be stored to a memory component (not shown) is composed of data elements taken from both the user current content register 1131 and alignment register 1130.

When an unaligned store operation is initiated following the first write, new data elements that are to be stored to memory are loaded from content register 1100 into the User current content register 1131. Once current content Register 1131 is loaded with its new values, a series of tandem, cascaded, single byte right-shift operations are automatically performed to produce sixteen subset vectors into the alignment multiplexer 1144, forming, for example, subset vectors 1103, 1104, 1105, 1106 and 1107. The alignment mux 1144 output vector will be selected from one of the 16 subset vectors using the Alignment mux control signal generated by the Alignment select logic 1145. The shifting may be based on a stride operand, wherein when the stride operand indicates forward stride, the subset vector 1105 is right shifted from the subset vector 1104. A most significant data element portion of the subset vector 1105 is derived in order from a least significant data element portion of the user current content register 1131. Additionally, a least significant data element portion of the subset vector 1105 is derived in order from a most significant data element portion of the alignment register 1130. The subset vectors may be generated through other techniques, such as those described elsewhere herein. Alignment logic 1045 in FIG. 10 correlates to the alignment logic 1145 in FIG. 11.

As previously described in FIG. 10, the Alignment Mux control signal is determined based on the modulus of the base address. As previously noted, if the memory line length is 16 bytes, and the alignment register and memory reference register is also 16 bytes long, then log 2(16) is 4, meaning that the lower four bits of the address vector 1120 are processed by Alignment mux select 1145 to control multiplexer 1144. The output of the Alignment mux 1144 is pushed into the normalized register 1108; register 1108 contains those data elements from Registers 1130 and 1131 that have been appropriately positioned relative to a memory line boundary for a subsequent write. The address modulus that sets the starting address target for subsequent stores will be updated to reflect the next target address as recorded in Address register 1120. For unaligned writes, the alignment control signal to mux 1144 selects the subset vector that contains the leftover data elements from the previous write and the new data elements from content register 1131 that have been appropriately positioned. For example, if the address modulus bits target the third byte lane of a user content as the starting point for a subsequent write operation, subset vector 1106 is selected as the output of the Alignment mux 1144. Subset vector 1106 corresponds to an unaligned 16 byte (i.e., data element) store, where the current content register 1131 has been right-shifted by 3 bytes, thereby positioning zeroth byte value of the user content into the third byte lane, while simultaneously shifting in the three MSB bytes from the alignment register 1130 into the corresponding LSB byte positions of subset vector 1106. In other words, the subset vector 1106 corresponds to a 16 byte vector write where the first three byte positions contain the leftover residual data from the thirteenth through fifteenth bytes that remained in alignment register 1130 from a preceding store operation, combining new data elements from content register 1131 that have been properly concatenated (or "conjoined") to the legacy data (from alignment register 1130 so as to fill the rest of the memory line. The output of the multiplexer 1144 is placed in normalized register 1108, which may be further processed in subsequent blocks. Once the active write is complete, the data elements from content register 1131 are copied into the alignment register 1130 in preparation for the next store operation. This iterative process of storing the content of register 1131 into alignment register 1130 is repeated at the end of each successive store operation until the final store access. The last (i.e., final) store sequence will be described in FIG. 12.

Following the alignment mux 1144 output vector into register 1108, a replicator stage 1109 multiplexes data from any lane of 1108 to any lane of the memory reference register 1110, thereby accomplishing lane replication as previously described for FIG. 8 and FIG. 10. All functions for those registers and control blocks subsequent to the Normalized Register 1108, including Lane Replicator 1109, Memory Reference 1110, Byte Lane control 1111 and Data Masking gates 1112, may be identical in function to their complementary blocks as described in FIG. 10. As previously described in FIG. 10, Byte lane controls are controlled via the Lane Selection Register 1122 and the address limit register 1121 respectively. In a fashion similar to the Forward Stride unaligned store operation described in FIG. 10, the 16 extra bits in the Lane Selection Register 1122 can explicitly disable a data element write enable to the memory component (not shown) for that bit or data-element lane. When using the address limit mechanism for forward stride unaligned store, if the address in address registrar 1120 for a bit or data-element is greater than the address limit address in Limit Register 1121, that bit or data-element is automatically disabled to prevent a write to the memory for that data element lane. If a data element is disabled, the appropriated Data masking gates 1112 affiliated with the disabled data elements are set to mask off that lane so that the disabled data element is not written into the memory component (not shown).

FIG. 12 illustrates an example final forward stride, unaligned store operation that may follow a series of cascaded store events as illustrated in FIG. 11 in accordance with some embodiments. The last store operation writes those residual data elements that have not yet been stored to memory. Consequently, the last store operation may be considered to be analogous to a priming load in a load operation. This last store operation is conditional on the state of the residual Vbit 1219. As has been previously noted in FIG. 11, all unaligned store operation set Vbit to logic high, and at the end of all unaligned writes (i.e., illustrated in FIG. 10 and FIG. 11), the data elements of content register 1131 are pushed into the alignment register 1130 so as to capture those data elements from a previous store that have not been written to memory. Consequently, if Vbit 1219 is set logic high, the alignment register contains bits or data-elements that have been left over from previous load operation and must still be stored to the memory component.

When a final, unaligned store operation is initiated, the residual data elements that are to be stored to memory have been loaded into the alignment register 1230, and no new data elements are loaded from the user register 1200 into the Current content Registers 1231. Consequently, the User current content register 1231 does not contain any relevant data that is to be stored into the memory component during a final store operation. As in the case for previous store sequences, once a final store operation is triggered, a series of tandem, cascaded, single byte right-shift operations are automatically performed to produce sixteen subset vectors into the alignment multiplexer 1244. However, those data positions that would have previously contained values loaded in from the Current Content Register 1231 are designate as don't care "x", as there are no new data elements in register 1231 for a final store. As previously described for forward stride store operations, each subset vector into mux 1244 includes of 16 data elements, where each vector's constituent elements are right-shifted by one byte from the preceding vector, and a new byte is "shifted in" to the subset vector's LSB position from the Alignment register 1130 in incrementally ascending (for a forward stride store access) indexed order. These alignment vectors into the mux 1244 are referred to as Store Subset vectors and are exemplified in subset vectors 1203, 1204, 1205, 1206 and 1207. Accordingly, subset vector 1203 does not contain any data that is to written to the memory component as it is representative of only User current content register 1231; Store subset vector 1204 shifts in the MSB from the Alignment register 1230 into the LSB position; subset vector 1205 right-shifts vector 1204 by one data element while shifting in the incrementally indexed fourteenth MSB from the Alignment register 1230 into the subset vector's zeroth LSB position. This tandem sequencing is repeated until the final subset vector 1207 is formed by right-shifting the preceding vector subset (not shown) one data element while shifting in the incrementally indexed MSB byte 1 of register 1230 into the LSB byte 0 position. The subset vectors may be generated through other techniques, such as those described elsewhere herein. The alignment mux 1244 output vector will be selected from one of the 16 subset vectors using the alignment mux control signal generated by the Alignment select logic 1245. Alignment logic 1245 in FIG. 12 correlates to the alignment logic 1145 in FIG. 11.

The alignment mux 1244 control signal is determined based on the modulus of the base address. The output of the Alignment mux 1244 is pushed into the normalized register 1208; register 1208 contains those residual data elements from Alignment Register 1230 that have been appropriately positioned relative to a memory line boundary for a subsequent forward stride write. The alignment control signal to mux 1244 selects the final subset vector that includes the residual data elements from the previous writes for a final write. For example, if the address modulus bits target byte lane '3' as the target address for the final write operation, subset vector 1206 is selected as the output of the Alignment mux 1244. Subset vector 1206 corresponds to an unaligned 16 byte (i.e., data element) store, where the first three LSB lanes contain values derived from the alignment register 1230 from the thirteenth through fifteenth byte. The other positions in subset vector 1206 are "don't care" values and will be masked off during the physical access to the memory component. The masking function will prevent corruption (i.e., erroneous over-write) of data already in memory that resides outside of the targeted store address range. In other words, subset vector 1206 captures the three residual bytes (i.e. the thirteenth through fifteenth byte of the alignment register) that remained from the preceding 16 byte write, where the preceding write included the zeroth through twelfth byte of content register 1131 of FIG. 11. Subset vector 1206 becomes the output of the multiplexer 1244 and is pushed into normalize register 1208.

The contents of register 1208 are further processed by replicator stage 1209 which multiplexes data from any lane of 1208 to any lane of the memory reference register 1210, thereby accomplishing lane replication as previously described for FIG. 10 and FIG. 11. In a fashion similar to the Forward Stride unaligned store operation described in FIG. 10, the 16 extra bits in the Lane Selection Register 1222 may explicitly disable a data element write to the memory component (not shown) for that bit or data-element lane. For the final forward stride store, those addresses indexed in address register 1220 that are greater than the address limit in Limit Register 1221 will be disabled to prevent a write to that address location within the memory. Consequently, the address limit value 1221 must correspond to the don't care "x" value loaded into the memory reference register 1210 so as to ensure that they are properly masked out during the physical write to memory. Accordingly, if a data element is disabled, the appropriated Data masking gates 1212 affiliated with the "x" data elements are set to be mask off so that the disabled data element does not corrupt data residing outside of the targeted load address range.

Figure 13:
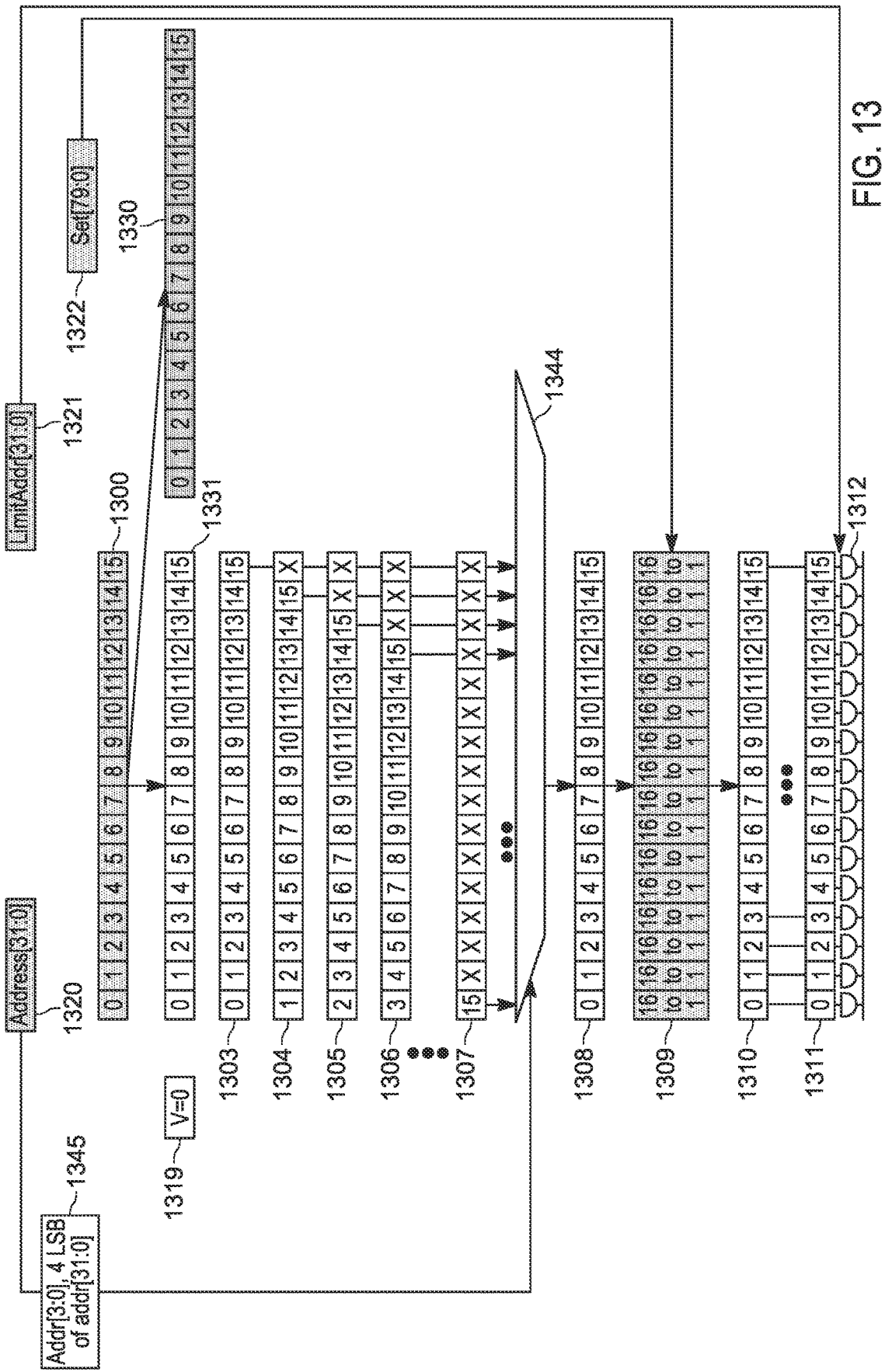
FIG. 13 is a block diagram of a memory system performing a reverse stride initial store to a memory.
Figure 14:
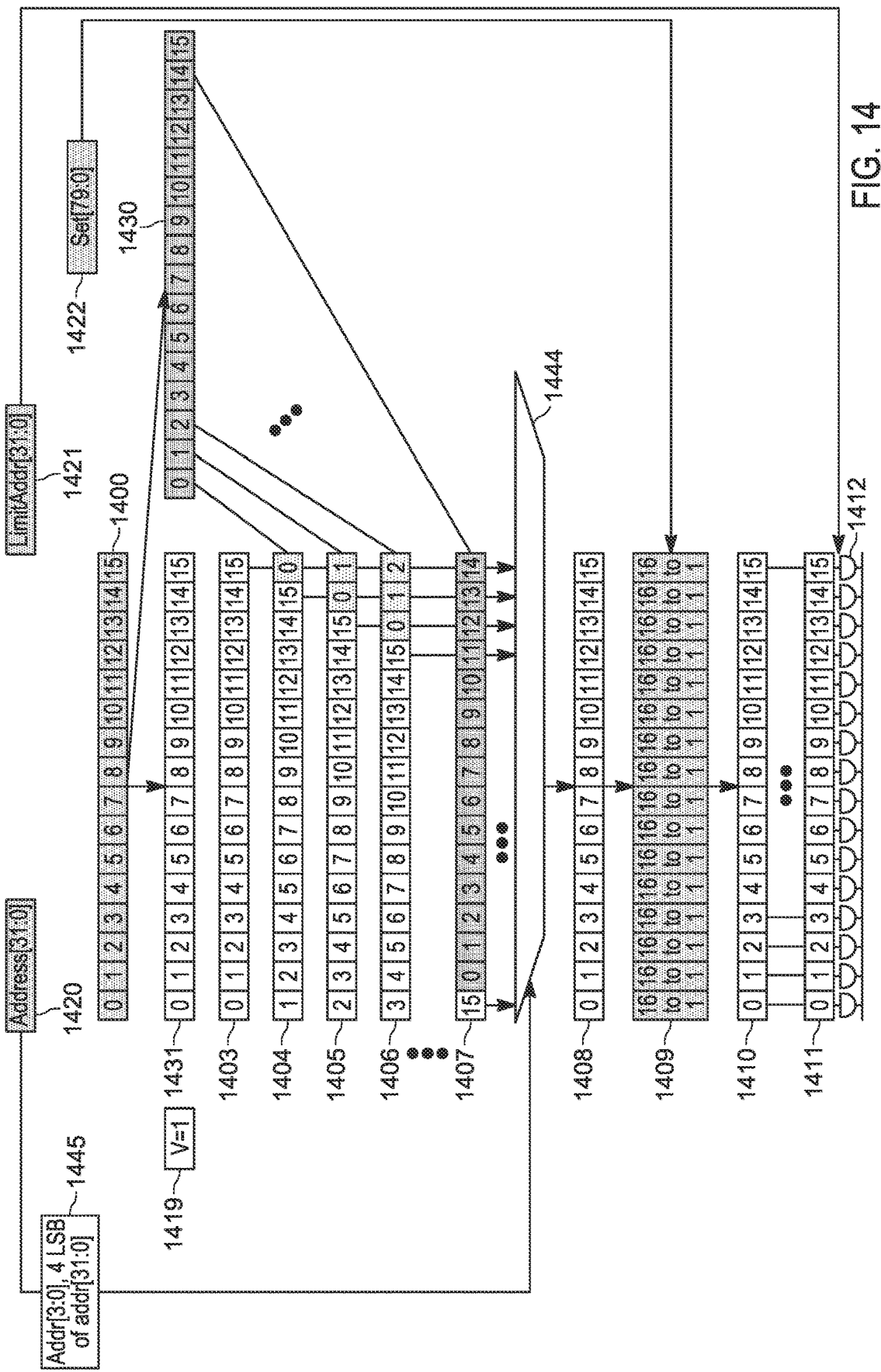
FIG. 14 is a block diagram of a memory system performing a reverse stride, unaligned nth store to a memory.
Figure 15:
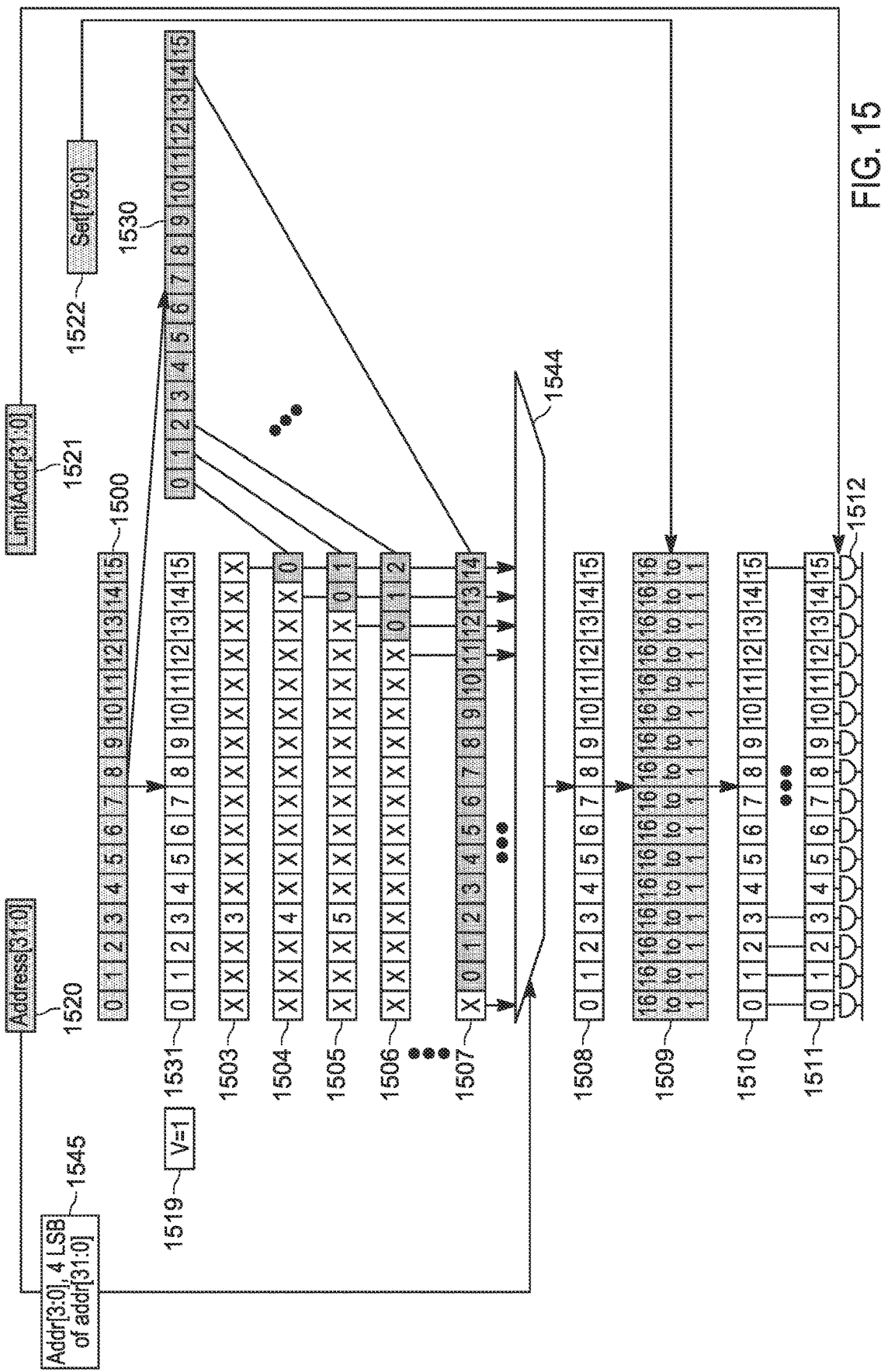
FIG. 15. is a block diagram of a memory system performing a reverse stride, unaligned last store to a memory.

FIGS. 13, 14 and 15 depict examples of reverse stride store operations that complement the aligned or unaligned forward stride store operation described in FIG. 10, FIG. 11, and FIG. 12 in accordance with some embodiments. Specifically, FIG. 13 illustrates a reverse stride store (i.e., write) operation during the first write access to a memory component. FIG. 14 illustrates a reverse stride store operation during subsequent reverse stride write accesses to a memory component following a first write access, wherein the V bit 1419 has been set to logic high. FIG. 15 illustrates a final reverse stride, unaligned store operation which follows a series of cascaded store events as described in FIG. 14. Note that Vbit 1319, 1419 and 1519 in FIG. 13, FIG. 14 and FIG. 15 correlates to the same Vbit 1019, 1119, and 1219 in FIG. 10, FIG. 11 and FIG. 12 respectively. One difference in the reverse stride store, as compared to the forward stride store, is that for a reverse stride store the address vectors are decremented for each successive write sequence. In forward store operations, the address pointer is positioned effectively at bit 0 of the data byte element (Least Significant Bit in a little Endean configuration), and memory reference indexes in ascending bit, byte, or line order. For a reverse stride memory store event, the address pointer is located at the at the Most Significant bit position of the byte address being targeted by the user and memory indexes in descending bit, byte, or line order. Therefore, for a reverse stride store operation, all of the internal store subset vector sequencing and address clamp mechanisms may be adjusted to supported address decimation as part of any write to a memory component. Specifically, an instruction word (such as that shown in FIG. 3) may be used to control the reverse stride memory store access, where the address pointer that targets the memory locations (i.e., address) is decremented for each data element that is written into memory. In addition, the address clamping gates 1312, 1412, and 1512 in FIG. 13, FIG. 14 and FIG. 15, in combination with address limit register 1321, 1421, and 1521, targets those data-elements that are to be masked out of the physical write to the memory component (not shown). For a reverse stride first store access to memory, any data element having an address greater than or equal to a specified address in limit register 1321 of FIG. 13, as indexed from the memory line is ascending order, is masked out. For a reverse stride final store access to memory, any data element having an address less than or equal to a specified address in limit register 1521 of FIG. 15, as indexed from the memory line is ascending order, is masked out. Masking a data element functions to intercept that particular element and prevent it from being written into memory so that address locations that resides outside of the targeted address range are not written to. Memory reference 1300, 1400, and 1500 represent byte addressable locations in the memory component that are targeted for the reverse stride writes, where each data element has a dedicated masking gate logic block 1312, 1412, and 1512 respectively.

For the first reverse stride store operation illustrated in FIG. 13, data-elements are first loaded into the current content Register 1331 from the data in content register 1300. Once current content Register 1331 is loaded with its new values, a series of tandem, cascaded, single byte left-shift operations are automatically performed to produce sixteen subset vectors into the alignment multiplexer 1344. Specifically each subset vector into mux 1344 includes 16 data elements, wherein the constituent elements from current content register 1331 are left shifted by one byte position (i.e., lane) from the preceding vector, and for a first write access each byte lane previously having the value of the zeroth byte of current content register 1331 is set as "don't care" (i.e., "x") in incrementally descending byte lane order. These subset vectors into the mux 1344 are referred to as reverse stride subset vectors and are exemplified in subset vectors 1303, 1304, 1305, 1306 and 1307. Accordingly, for a reverse stride first store operation, subset vector 1303 contains all data elements in current content register 1331 and is indicative of an aligned reverse stride store/write event; subset vector 1304 left-shifts vector 1303 by one data element while setting the MSB fifteenth byte lane position to an "x" indicating an undefined state at that data element location; subset vector 1305 left-shifts vector 1304 by one data element while setting MSB positions for fourteenth and fifteenth lanes to an "x," indicating an undefined state for those data element positions. This tandem sequencing is repeated for the first store operation until the final subset vector 1307 is formed by left-shifting the preceding vector subset (not shown) one data element while setting lanes for the first through fifteenth bytes to an "x," indicating an undefined state for those data element locations. For subset vector 1307, only the fifteenth byte value from current content register 1331 remains, being located in the zeroth lane; all other byte positions are flagged as don't care states.

For the first reverse stride store operation to a memory component, the alignment register 1330 is not utilized; however, the alignment register 1030 may be utilized during subsequent memory line writes that may be part of a contiguous memory store operations, as will be described is FIG. 14 and FIG. 15. The alignment mux 1344 output will be selected from one of the 16 subset vectors using the Alignment mux control signal generated by the Alignment select logic 1345. Alignment select logic 1345 correlates to Alignment logic 1045 of FIG. 10 that has been configured for a reverse stride write.

As in the case for a forward stride store to memory, the Alignment Mux control signal from logic block 1345 for a reverse stride store operation in FIG. 13 is determined by the base address modulus. For this embodiment, if the memory line length is 16 bytes, and the alignment register and memory reference register is also 16 bytes long, then log 2(16) is 4, meaning that the lower four bits of the address vector 1320 is processed by Alignment mux select 1345 to control multiplexer 1344. The output of the Alignment mux 1344 is pushed into the normalized register 1308; register 1308 corresponds to that portion of the current content Register 1331 whose data has been appropriately positioned relative to a memory line boundary of the memory component. By way of example, if the address modulus bits are ZERO, then the alignment mux control output from select logic 1345 is set to zero and the Store vector subset vector 1303 is selected as the output of Alignment mux 1344. Subset vector 1303 corresponds to an aligned 16 byte store, where 1303 contains the entirety of the current content register 1331, which is then selected by the alignment mux 1344 to be written into the normalized register 1308. If the modulus is other than ZERO, then for a reverse stride, first store operation, the data elements from the current content register 1330 are appropriately left-shifted to produce the Normalized register 1308 content in a manner previously described above. For example, if the modulus bits have a value of '12' (i.e., 0xC hex) so as to target lane the twelfth byte lane position of user content as the starting point for a reverse stride write, the Alignment mux control signal from logic 1345 will select vector subset content 1306 corresponding to subset vector 1306. Subset vector 1306 corresponds to an unaligned 16 byte reverse stride store, where the current content register 1331 has been left-shifted by 3 bytes, thereby positioning the fifteenth byte value into the twelfth lane position, while simultaneously setting the upper three MSB byte positions of subset vector 1306 to "x" indicating a don't care value for these lane positions. In other words, subset vector 1306 corresponds to a 16 byte reverse stride write where the three MSB positions are to be masked out as they represent memory address locations that are outside of the targeted address range for a first reverse stride store operation. The output of the multiplexer 1344 selects subset vector 1306 as an output, which is placed in register 1308, thereby producing the contents for the first write to the memory component. Subsequent store operations and the last store operation, that taken together include a full store sequence, are described in FIG. 14 and FIG. 15 respectively.

When a first reverse stride write access to a memory component is initiated by a store operand, the "V bit" 1319 is set to a logic zero. For subsequent store events affiliated with an unaligned store operation, the V bit 1319 is set to logic high. After the first store iteration, the user current content register values 1331 is transferred to the alignment register 1330 and the V bit 1319 is set logic high if all data-elements in register 1331 have not been stored to memory (i.e., the store operation was an unaligned write). In the case where the address modulus equals zero, the store operation is an aligned write where subset vector 1303 is always selected as the output of Alignment mux 1344, and all data elements from current content register 1331 are written to memory. Consequently, for the reverse stride aligned write to memory, the residual V bit 1319 remains clear for the first store operations, and all subsequent aligned reverse stride store operations.

Following the Normalized Data register 1308 is the lane replicator logic 1309 which multiplexes data from any lane of 1308 to any lane of the memory reference register 1310, thereby accomplishing lane replication as previously described for FIG. 10. In addition to the 64 bits of encoded control signaling (4 bits×16 byte lanes produces 64 bits allocated for input signal selection) there are 16 additional bits in Control register 1322, which may be used to enable the multiplex output to the appropriate output lane in the memory reference 1310, or alternatively set the output of a given lane's byte value to ZERO. When using the address limit mechanism for reverse stride unaligned store, if the address in address register 1320 for a bit or data-element is less than the address limit address in limit register 1321, that bit or data-element is automatically disabled to prevent a write to memory that is outside of the targeted address range. If a data element is disabled, the appropriated data masking gates 1312 affiliated with the disabled data elements are set to mask off that lane so that the disabled data element is not written into the memory component (not shown).

For reverse stride store operations, the address masking gates 1312 in combination with an address limit register 1321 are used to generate the appropriate mask for the first reverse stride store event. Specifically, for the first reverse stride store operation, any data element having an address greater than, or equal to, a specified address limit value in limit register 1321, as indexed for the memory line in ascending order, is intercepted and that byte's lane mask is set to disable the active write for that particular byte address. Byte Lane control register 1311 represents byte addressable memory elements access from the memory reference register 1310, whereby each data lane is indexed with a unique byte address. Below lane control 1311 is data masking logic 1312 represented by an array of AND-gate logic symbols. Each AND gate within the AND gate array 1312 is assigned to a corresponding data element lane from the memory reference register 1310. Based on the address in 1320 and the limit address register 1321, when the memory line byte address for the data elements in memory register 1310 are greater than the address limit value in 1321, a write disable signal (i.e., mask) is generated to prevent that particular data element from being written to the memory component. The output of the AND gate array 1312 connects to the memory component (not shown) which is being accessed in the data store operation. In the case of an aligned store event, where the address modulus of 'zero', Limit address register 1321 is set to allow all data elements from register 1310 (which contains the entire content of user current content register 1331) to be transferred through gate control 1311 and subsequently stored to memory. In the case of an unaligned first store event, masking ages 1312 are set to mask out those data elements in register 1310 that are greater than or equal to the address in Limit address register 1321 (i.e., those elements that had a "x" value") so as to prevent them from being written to memory. Values in write address register 1320, limit address register 1321, replicator lane selection register 1322, and the address modules selection from mux control 1345 that sets the output of the alignment mux 1344, may all be properly managed so as to produce a reverse stride first store operation that appropriately masks out those byte lanes that are not targeted for a memory write, while ensuring the appropriate byte values are written to the correct memory address locations within the memory component. These index values in registers 1320, 1321, and 1322 may be manually updated or automatically managed after each successive write to a memory line based on the legacy index values from the preceding store iteration and the particular memory line length for the targeted memory component.

FIG. 14 illustrates a reverse stride store operation during subsequent write accesses to a memory component following a first reverse write access (illustrated in FIG. 13) has residual bits left over that were not stored to memory. As has been previously noted, if data-elements from a previous store event have not been written to memory (i.e., the store operation is an unaligned write, meaning that data elements in register 1431 were not stored to memory during a previous write), then Vbit 1419 is set to logic high in FIG. 14, whereby the address register 1420 (which correlates to register 1320 in FIG. 13) indexes the store operation to write the user content vector 1400 to a memory location that is not aligned with the memory line length (i.e., the address modulus is not equal to zero). When Vbit 1419 of FIG. 14 is logic high, the legacy data in user current content register 1331 of FIG. 13 (i.e., data elements from the preceding write) has been copied into the Alignment register 1430 in FIG. 14 (correlates to 1330 of FIG. 13) at the end of the first store operation. At the end of all subsequent reverse stride writes where Vbit 1419 is logic high, the data elements of content register 1431 are pushed into the alignment register 1430 to capture any data elements from a previous store that may not been written to memory.

Consequently, when 1419 Vbit=1, the data elements in memory reference register 1410 that is to be stored to memory is includes data elements taken from both the user current content register 1431 and alignment register 1430.

When an unaligned store operation is initiated following the first write, new data elements that are to be stored to memory are loaded from content register 1400 into the user current content register 1431. Once current content register 1431 is loaded with its new values, a series of tandem, cascaded, single byte left-shift operations are automatically performed to produce sixteen subset vectors into the alignment multiplexer 1444. Specifically, each subset vector into mux 1444 includes 16 data elements, where each vector's constituent elements from User current content register 1431 are left-shifted by one byte from the preceding vector, and a new byte is "shifted in" to the subset vector's MSB position from the Alignment register 1430 in incrementally descending (for a reverse stride store) indexed order. These alignment vectors into the mux 1444 are referred to as reverse stride subset vectors and are exemplified in subset vectors 1403, 1404, 1405, 1406 and 1407. Accordingly, subset vector 1403 contains all data elements in user current content register 1431 and is indicative of an aligned store operation; Subset vector 1404 left-shifts vector 1403 one data element while shifting in the LSB zeroth byte from the Alignment register 1430 into the MSB fifteenth lane position; Subset Vector 1405 left-shifts vector 1404 by one data element while shifting in the incrementally indexed LSB first byte value from the Alignment register 1430 into the subset vector's MSB fifteenth position. This tandem sequencing is repeated until the final Subset Vector 1407 is formed by left-shifting the preceding vector subset (not shown) one data element while shifting in the incrementally indexed LSB byte 14 from the alignment register 1430. Accordingly, FIG. 14 depicts subset vectors shifted from other subset vectors. For example, the subset vector 1405 is left shifted from the subset vector 1404. A least significant data element portion of the subset vector 1404 is derived in order from a most significant data element portion of the current content register 1431. And a most significant data element portion of the subset vector 1405 (the last fourteen data elements of subset vector 1405) is derived in order from a least significant data element portion of the alignment register 1430. The least significant and most significant data element portions can be any size less than the size of the subset vectors. As shown, the subset vector 1405 is shifted by a number of left shift data elements—two. The number of left shift data elements is equal to a number of data elements of the most significant data element portion of the current content register 1431 (two). The direction of shift, and the specific contents from which registers the subset vectors are generated may be based on the operating direction of stride. For example, the subset vectors may be generated as just described when a stride operand of an instruction word indicates reverse stride. The alignment mux 1444 output vector will be selected from one of the 16 subset vectors using the alignment mux control 1445 signal. Alignment logic 1345 in FIG. 13 correlates to the alignment logic 1445 in FIG. 14.

Note that while subset vector 1403 in included in FIG. 14 for clarity and symmetry, the subset vector 1403, as depicted having all the content from the user current content register 1431, will not be selected as an output of alignment mux 1444 in FIG. 14 for unaligned writes affiliated with subsequent store operations after a first reverse stride store. Subset vector 1403 contains all data elements from current content register 1431 and is therefore utilized only in aligned write operation, where Vbit 1419 is always clear. For FIG. 14, Vbit is set to logic high thereby indicating an unaligned write operation as has been previously described.

As previously described for both forward and reverse stride store operation, the Alignment Mux control signal is determined based on the modulus of the base address. Because FIG. 4 depicts use of a 16 data-element line length, the lower four bits of the address vector 1420 is processed by alignment mux select 1445 to control multiplexer 1444. For unaligned writes, the alignment control signal to mux 1444 selects the subset vector that contains the leftover data elements from the previous write and the new data elements from content register 1431 that have been appropriately positioned. For example, if the address modulus bits target the twelfth byte lane as the starting point for a subsequent write operation, subset vector 1406 is selected as the output of the alignment mux 1444. Subset vector 1406 corresponds to an unaligned 16 byte (i.e., data element) store, where the current content register 1431 has been left-shifted by 3 bytes, thereby positioning the fifteenth byte value of register 1431 into byte lane twelve, while simultaneously shifting the three LSB bytes from the alignment register 1430 into the corresponding MSB byte positions of subset vector 1406. In other words, subset vector 1406 captures the zeroth through second byte values that were left over from the first reverse stride write, and positions them in the first three MSB byte positions in a subsequent 16 byte vector 1406 that also contain the new data elements from content register 1431 that have been properly concatenated (or "conjoined") to the legacy data so as to fill the rest of the memory line. The output of the multiplexer 1444 is placed in normalize register 1408, which may be further processed in subsequent blocks. Once the active write is complete, the data elements from content register 1431 are copied into the alignment register 1430 in preparation for the next store iteration. This iterative process of storing the content of register 1431 into alignment register 1430 is repeated at the end of each successive store operation until the final reverse stride store access. The last (i.e., final) store sequence will be described in FIG. 15.

Following the alignment mux 1444 output vector into register 1408, a replicator stage 1409 that multiplexes data from any lane of 1408 to any lane of the memory reference register 1410, thereby accomplishing lane replication as previously described for FIG. 10 and FIG. 13. All functions for those registers and control blocks subsequent to the Normalized Register 1408, including Lane Replicator 1409, Memory Reference 1410, Byte Lane control 1411 and Data Masking gates 1412, may be identical in function to their complementary blocks as described in FIG. 13. As previously described in FIG. 13, Byte lanes are controlled via the Lane Selection Register 1422 and the address limit register 1421 respectively. In a fashion similar to the Forward Stride unaligned store operation described in FIG. 10, the 16 extra bits in the Lane Selection Register 1422 can disable a data element write to the memory component (not shown) for that bit or data-element lane. When using the address limit mechanism for reverse stride unaligned store, if the address in address registrar 1420 for a bit or data-element is less than the address limit address in limit register 1421, that bit or data-element is automatically disabled to prevent a write to the memory that exceeds the targeted address range. If a data element is disabled, the appropriated Data masking gates 1412 affiliated with the disabled data elements are set to mask off that lane so that the disabled data element is not written into the memory component.

FIG. 15 illustrates an example final reverse stride, unaligned store operation in accordance with some embodiments that may follow a series of cascaded reverse stride store events as illustrated in FIG. 14. The last store operation writes those residual data elements that have not yet been stored to memory. As has been previously noted in FIG. 14, all unaligned store operation set Vbit to logic high, and at the end of all reverse stride unaligned writes (i.e., illustrated in FIG. 13 and FIG. 14), the data elements of content register 1531 are pushed into the alignment register 1530 to capture those data elements from a previous store that have not been written to memory. Consequently, if Vbit 1519 is set logic high, the alignment register contains bits or data-elements that have been left over from previous load operation and must still be stored to the memory component.

When a final, reverse stride unaligned store operation is initiated, the residual data elements that are to be stored to memory have been loaded into the alignment register 1530, and no new data elements are loaded from the user register 1500 into the current content register 1531. Consequently, the user current content register 1531 does not contain any relevant data that is to be stored into the memory component during a final store operation. As in the case for previous store sequences, once a final store operation is triggered, a series of tandem, cascaded, single byte left-shift operations are automatically performed to produce sixteen subset vectors into the alignment multiplexer 1544. However, those data lanes that would have previously contained values loaded in from the Current Content Register 1531 are designate as don't care "x", as there are no new data elements in register 1531 for a final store. As previously described for reverse stride store operations, each subset vector into mux 1544 includes 16 data elements, where each vector's constituent elements are left-shifted by one byte from the preceding vector, and a new byte is "shifted in" to the subset vector's MSB position from the Alignment register 1530 in incrementally descending (for a reverse stride store) indexed order. These alignment vectors into the mux 1544 are referred to as reverse stride subset vectors and are exemplified in the subset vectors 1503, 1504, 1505, 1506 and 1507. Accordingly, subset vector 1503 does not contain any data that is to be written to the memory component as it is representative of only user current content register 1531. Subset vector 1504 shifts in the LSB zeroth byte value from the Alignment register 1530 into the vector 1504's MSB fifteenth byte position. Subset vector 1505 left-shifts vector 1504 by one data element while shifting in the incrementally indexed LSB first byte from the Alignment register 1530 into the subset vector's MSB position. This tandem sequencing is repeated until the final store subset vector 1507 is formed by left-shifting the preceding vector subset (not shown) one data element while shifting in the incrementally indexed LSB fourteenth byte value of register 1530 into the MSB position of subset vector 1507. The alignment mux 1544 output vector will be selected from one of the 16 subset vectors using the Alignment mux control signal generated by the alignment select logic 1545. The Alignment Mux 1544 control signal is determined based on the modulus of the base address. The output of the Alignment mux 1544 is pushed into the normalized register 1508; register 1508 contains those residual data elements from Alignment Register 1530 that have been appropriately positioned relative to a memory line boundary for a subsequent reverse stride write. The alignment control signal to mux 1544 selects the final subset vector that captures the residual data elements from the previous writes. For example, if the address modulus bits target byte lane '12' as the target point for the final reverse stride write operation, subset vector 1506 is selected as the output of the alignment mux 1544. Subset vector 1506 corresponds to an unaligned 16 byte (i.e., data element) store, where the last three MSB lanes corresponding to the thirteenth through fifteenth byte positions contain alignment register 1530's zeroth through second byte values, respectively. The other positions in subset vector 1506 are "don't care" values and will be masked off during the physical access to the memory component. The masking function will prevent erroneous over-write of data already in memory that resides outside of the targeted store address range. In other words, subset vector 1506 captures the three residual bytes (i.e., the zeroth through second byte values) that remained from the preceding 16 byte write that included the third byte through the fifteenth byte of alignment register 1530 (i.e., refer to 1406 of FIG. 14 for the previous write byte values). Subset vector 1506 becomes the output of the multiplexer 1544 and is pushed into normalize register 1508.

The processing registers and block following register 1508 may be identical to the companion blocks described in FIG. 13 and FIG. 14. Specifically, replicator stage 1509 multiplexes data from any lane of 1508 to any lane of the memory reference register 1510, thereby accomplishing lane replication as previously described. As previously described in FIG. 14, byte lane controls are controlled via the lane selection register 1522 and the address limit register 1521 respectively. In the same fashion as delineated in a reverse stride unaligned store operation described in FIG. 14, the 16 extra bits in the Lane Selection Register 1522 may explicitly disable a data element write enable to the memory component (not shown) for that bit or data-element lane that lies outside of the targeted address range. For the final reverse stride store, those addresses indexed in address register 1520 that are less than the address limit in limit register 1521 will be disabled to prevent a write to those address locations within the memory component.

Consequently, the address limit value 1521 must correspond to the don't care "x" value loaded into the memory reference register 1510 so as to ensure that they are properly masked out during the physical write to memory. Accordingly, if a data element is disabled, the appropriated Data masking gates 1512 affiliated with the "x" data elements are set to be mask off so that the disabled data element does not corrupt data residing outside of the targeted load address range.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Aspects of one figure, for example, can be combined with aspects of another The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims, including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or device that comprises, has, includes, contains a list of elements does not include only those elements but may include other elements not expressly listed or inherent to such process, method, article, or device. An element proceeded by "comprises . . . a," "has . . . a," "includes . . . a", "contains . . . a" does not, without more constraints, preclude the existence of additional identical elements in the process, method, article, or device that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or device described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A memory system comprising:
  a load and store unit (LSU), the LSU comprising an alignment register, a current memory reference register, and a vector register;
  a memory coupled to the LSU, the memory operable to store a memory reference, the memory reference comprising a first memory line and a second memory line, wherein the LSU is operable to:
    load at least a portion of the first memory line into the alignment register, thereby forming an alignment register content to form a priming load; and
    load at least the portion of the second memory line into the current memory reference register, thereby forming a current memory reference register content;
    when the memory reference is aligned in the memory, load the alignment register content into the vector register to perform an aligned production read; and
    when the memory reference is unaligned in the memory:
      conjoin a portion of the alignment register content and a portion of the current memory reference register content into the vector register to perform an unaligned production read; and
      copy the current memory reference register to the alignment register.

2. The memory system of claim 1, wherein the LSU is further operable to store at a memory address, the LSU having load and store symmetry such that the LSU is further operable to:
  store a first user content into the current memory reference register;
  when the memory address is aligned:
    store during an aligned store, the first user content into the vector register; and
  when the memory address is unaligned:
    update the alignment register from the current memory reference register;
    update the current memory reference register with a second user content; and
    conjoin a portion of the memory reference register with a portion of the alignment register into the vector register during an unaligned store.

3. The memory system of claim 1, wherein the LSU is further operable to iteratively repeat loads after the priming load until the entire memory reference is loaded.

4. The memory system of claim 1, wherein the LSU further comprises an address clamp coupled to the current memory reference register and the alignment register, the address clamp operable to zero at least a portion of the memory reference, the portion of the memory reference beyond an address range such that the address clamp is operable to generate at least the portion of the first memory line and at least the portion of the second memory line, the address range selected based at least on a stride operand.

5. The memory system of claim 1, wherein the LSU is operable to generate a plurality of subset vectors.

6. The memory system of claim 5, wherein the LSU further comprises a vector lane replicator, the vector lane replicator operable to:
  receive a subset vector of the plurality of subset vectors, the subset vector comprising a plurality of data elements; and
  rearrange at least a portion of the plurality of data elements.

7. The memory system of claim 6, wherein the vector lane replicator is operable to zero at least a second portion of the plurality of data elements.

8. The memory system of claim 5, wherein the LSU generates the plurality of subset vectors from the current memory reference register and the alignment register, the plurality of subset vectors comprising a first subset vector and a second subset vector, the second subset vector shifted based at least on a stride operand.

9. The memory system of claim 8, wherein the LSU further comprises an alignment multiplexor and the LSU is operable to input the plurality of subset vectors into the alignment multiplexor.

10. The memory system of claim 9, wherein the LSU is operable to generate the plurality of subset vectors such that:
  when the stride operand indicates reverse stride:
    the second subset vector is right shifted from the first subset vector;
    a least significant data element portion of the second subset vector is derived in order from the most significant data element portion of the current memory reference register; and
    a most significant data element portion of the second subset vector is derived in order from a least significant data element portion of the alignment register; and
  when the stride operand indicates forward stride:
    the second subset vector is left shifted from the first subset vector;
    a most significant data element portion of the second subset vector is derived in order from a least significant data element portion of the current memory reference register; and
    a least significant data element portion of the second subset vector is derived in order from a most significant data element portion of the alignment register.

11. The memory system of claim 10, wherein:
  when the stride operand indicates reverse stride, the second subset vector is right shifted by a number of right shift data elements, the number of right shift data elements equal to a number of data elements of the most significant data element portion of the current memory reference register; and
  when the stride operand indicates forward stride, the second subset vector is left shifted by a number of left shift data elements, the number of left shift data elements equal to a number of data elements of the least significant data element portion of the current memory reference register.

12. The memory system of claim 1, wherein the LSU is operable to:
  receive an instruction word, the instruction word comprising a memory address and a memory line length content; and
  in response to the memory address, determine whether to perform at least one of the group selected from the aligned production read and the unaligned production read.

13. A memory system comprising:
  a memory;
  a load and store unit (LSU) coupled to the memory, the LSU comprising an alignment register, a vector register; and a user current content register, the LSU operable to store to the memory at a memory address, the LSU operable to:
    store a first user content into the user current content register;
    when the memory address is aligned:
      store during an aligned store, the first user content into the vector register; and
    when the memory address is unaligned:
      update the alignment register from the user current content register;
      update the user current content register with a second user content; and
      conjoin a portion of the user current content register with a portion of the alignment register into the vector register during an unaligned store.

14. The memory system of claim 13, wherein the LSU is further operable to iteratively repeat storing after the first user content is stored into the user current content register, until the LSU stores to all of the memory reference.

15. The memory system of claim 13, wherein the LSU further comprises an address clamp coupled to the vector register, the address clamp operable to zero at least a portion of the first user content, thereby generating a masked user content, that inhibits storing data elements for at least the portion of the first user content beyond an address range, the address range selected based at least on a stride operand.

16. The memory system of claim 13, wherein the LSU is operable to generate a plurality of subset vectors.

17. The memory system of claim 16, wherein the LSU further comprises a vector lane replicator, the vector lane replicator operable to:

receive a subset vector of the plurality of subset vectors, the subset vector comprising a plurality of data elements; and rearrange at least a portion of the plurality of data elements.

18. The memory system of claim 17, wherein the vector lane replicator is operable to zero at least a second portion of the plurality of data elements.

19. The memory system of claim 16, wherein the LSU generates the plurality of subset vectors from the user current content register and the alignment register, the plurality of subset vectors comprising a first subset vector and a second subset vector, the second subset vector shifted based at least on a stride operand.

20. The memory system of claim 19, wherein the LSU further comprises an alignment multiplexor and the LSU is operable to input the plurality of subset vectors into the alignment multiplexor.

21. The memory system of claim 20, wherein the LSU is operable to generate the plurality of subset vectors such that:
when the stride operand indicates reverse stride:
the second subset vector is left shifted from the first subset vector
a least significant data element portion of the second subset vector is derived in order from a most significant data element portion of the user current content register; and
a most significant data element portion of the second subset vector is derived in order from a least significant data element portion of the alignment register; and
when the stride operand indicates forward stride:
the second subset vector is right shifted from the first subset vector;
a most significant data element portion of the second subset vector is derived in order from a least significant data element portion of the user current content register; and
a least significant data element portion of the second subset vector is derived in order from a most significant data element portion of the alignment register.

22. The memory system of claim 21, wherein
when the stride operand indicates reverse stride, the second subset vector is left shifted by a number of left shift data elements, the number of left shift data elements equal to a number of data elements of the least significant data element portion of the alignment register; and
when the stride operand indicates forward stride, the second subset vector is right shifted by a number of right shift data elements, the number of right shift data elements equal to a number of data elements of the most significant data element portion of the alignment register.

23. The memory system of claim 13, wherein the LSU is operable to:
receive an instruction word, the instruction word comprising at least a memory address and a memory line length content; and
in response to the memory address, determine whether to perform at least one of the group selected from the aligned store and the unaligned store.

24. The memory system of claim 13, wherein the LSU performs at least one of the group selected from the aligned store and the unaligned store based on the value of a valid bit (V bit).

* * * * *